(12) United States Patent
Hayashi

(10) Patent No.: US 7,275,614 B2
(45) Date of Patent: Oct. 2, 2007

(54) PEDAL SUPPORT STRUCTURE FOR VEHICLE

(75) Inventor: Kouji Hayashi, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 345 days.

(21) Appl. No.: 11/000,245

(22) Filed: Dec. 1, 2004

(65) Prior Publication Data

US 2005/0140175 A1 Jun. 30, 2005

(30) Foreign Application Priority Data

| Dec. 25, 2003 | (JP) | ............................. 2003-431188 |
| Dec. 25, 2003 | (JP) | ............................. 2003-431189 |
| Dec. 25, 2003 | (JP) | ............................. 2003-431190 |
| Dec. 25, 2003 | (JP) | ............................. 2003-431192 |

(51) Int. Cl.
*B60K 28/10* (2006.01)

(52) U.S. Cl. ......................... 180/274; 74/512

(58) Field of Classification Search ................ 180/274, 180/315; 74/512, 560; 280/748, 750; 188/377
See application file for complete search history.

(56) References Cited

U.S. PATENT DOCUMENTS

| 6,041,674 | A * | 3/2000 | Kato ............................. 74/512 |
| 6,327,930 | B1 | 12/2001 | Ono et al. |
| 6,339,971 | B1 | 1/2002 | Kato |
| 6,481,311 | B1 | 11/2002 | Sanagi et al. |
| 6,655,489 | B2 * | 12/2003 | Kawai et al. ................ 180/274 |
| 7,090,046 | B2 * | 8/2006 | Nebuya et al. ............. 180/274 |
| 7,111,703 | B2 * | 9/2006 | Endo et al. .................. 180/274 |
| 2005/0044982 | A1 * | 3/2005 | Hayashi ....................... 74/560 |
| 2005/0140175 | A1 * | 6/2005 | Hayashi ................. 296/187.05 |
| 2006/0070487 | A1 * | 4/2006 | Hayashi ....................... 74/560 |

FOREIGN PATENT DOCUMENTS

| JP | 9-254821 | 9/1997 |
| JP | 10-44947 | 2/1998 |

* cited by examiner

*Primary Examiner*—Paul N. Dickson
*Assistant Examiner*—Karen J Amores
(74) *Attorney, Agent, or Firm*—Nixon Peabody LLP; Donald R. Studebaker

(57) ABSTRACT

According to a pedal support structure, the slide comprises two slide portions constituted of the first and second contact points and the first and second guide faces. Further, these contact portions and these guide faces are respectively located longitudinally separately from each other, and are located so as to be offset from each other in the vehicle width direction, whereby the first and second contact portions and the first and second guide faces can be located substantially horizontally.

Accordingly, there can be provided the pedal support structure which can improve flexibility of a layout of the guide face to guide a position change of a pedal bracket and to make the structure compact.

25 Claims, 15 Drawing Sheets

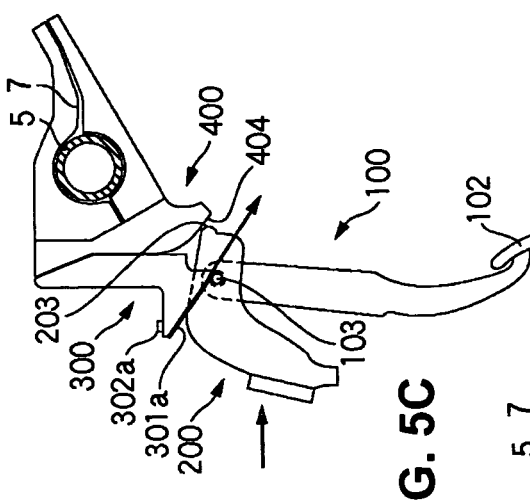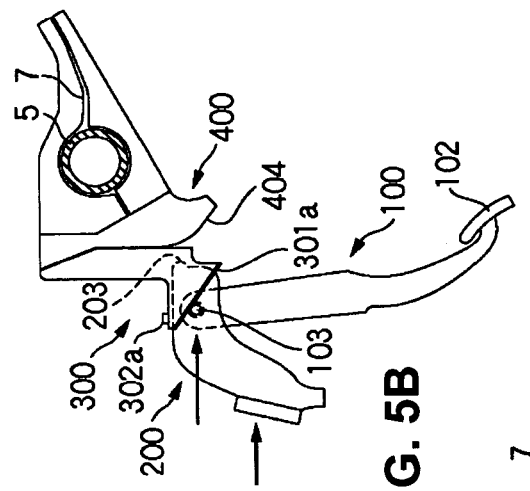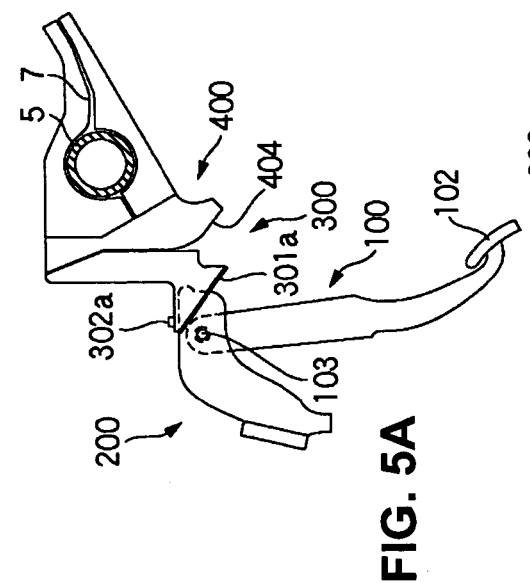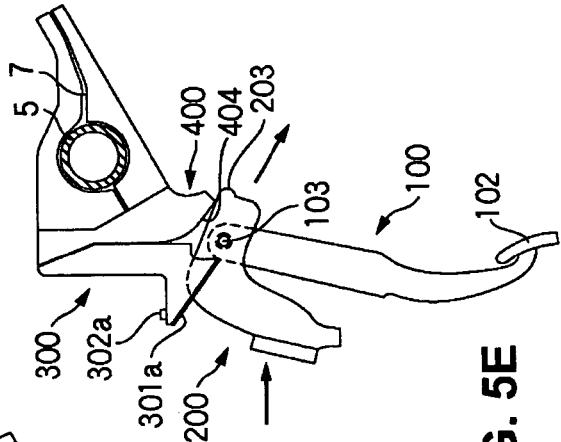

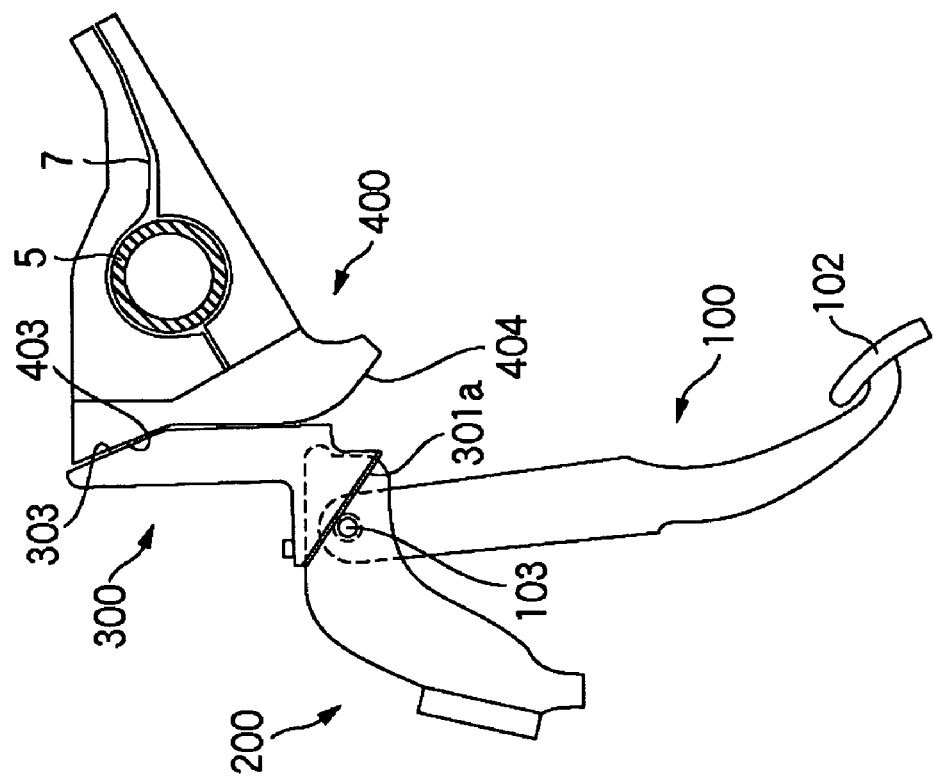
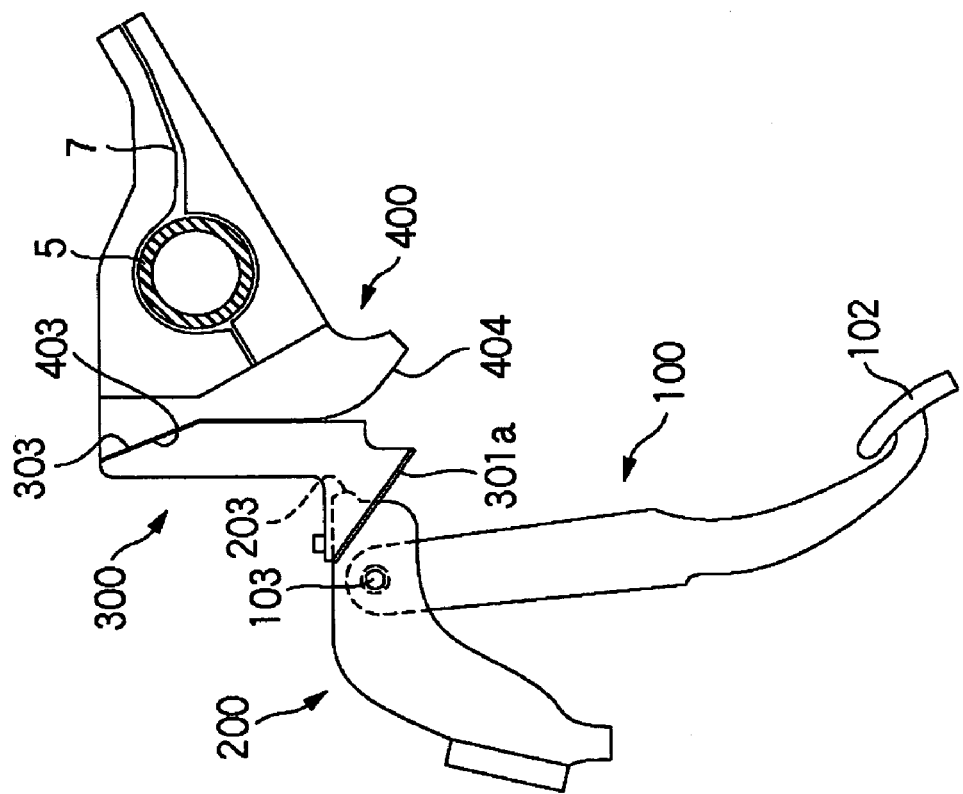

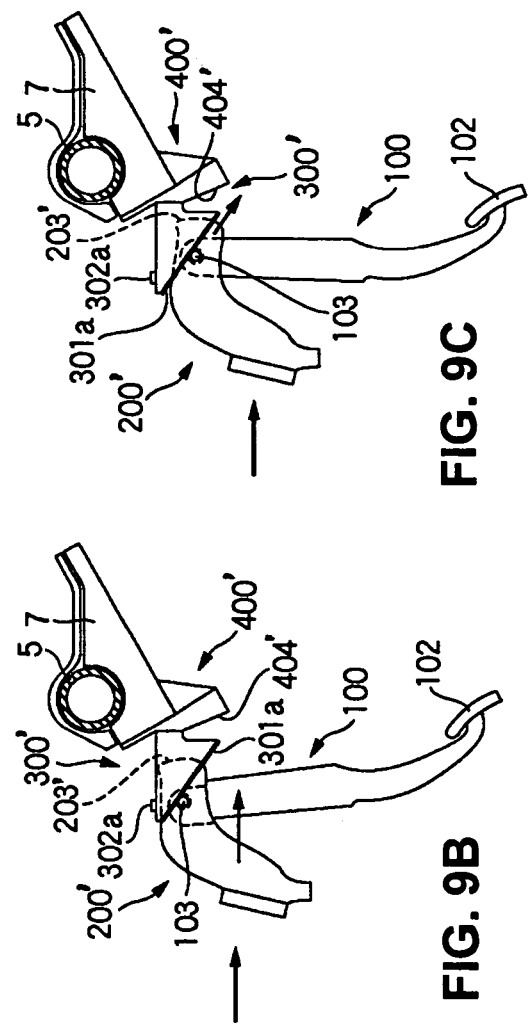
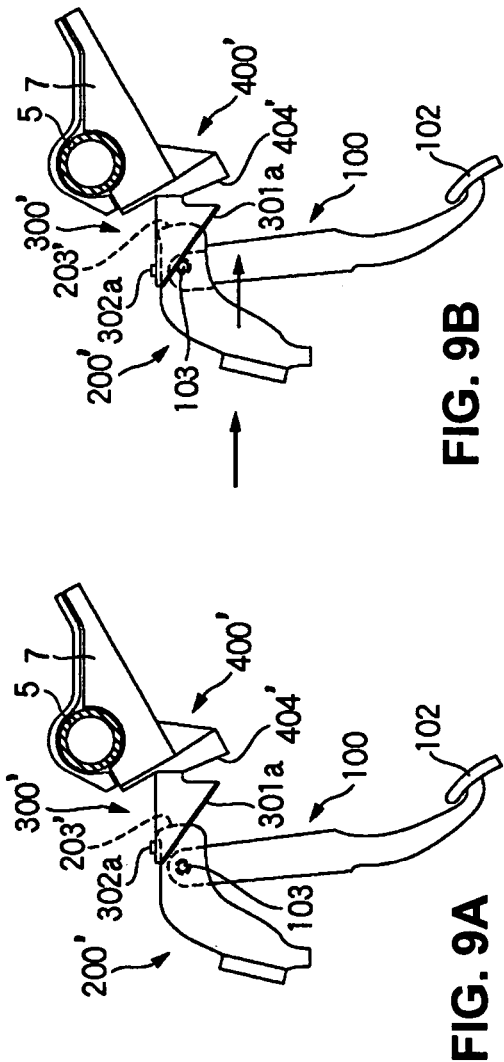
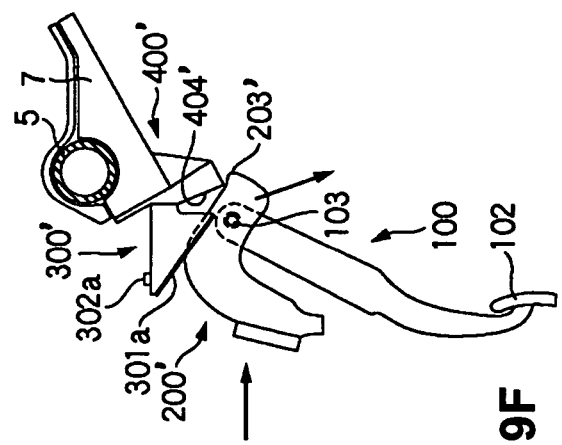
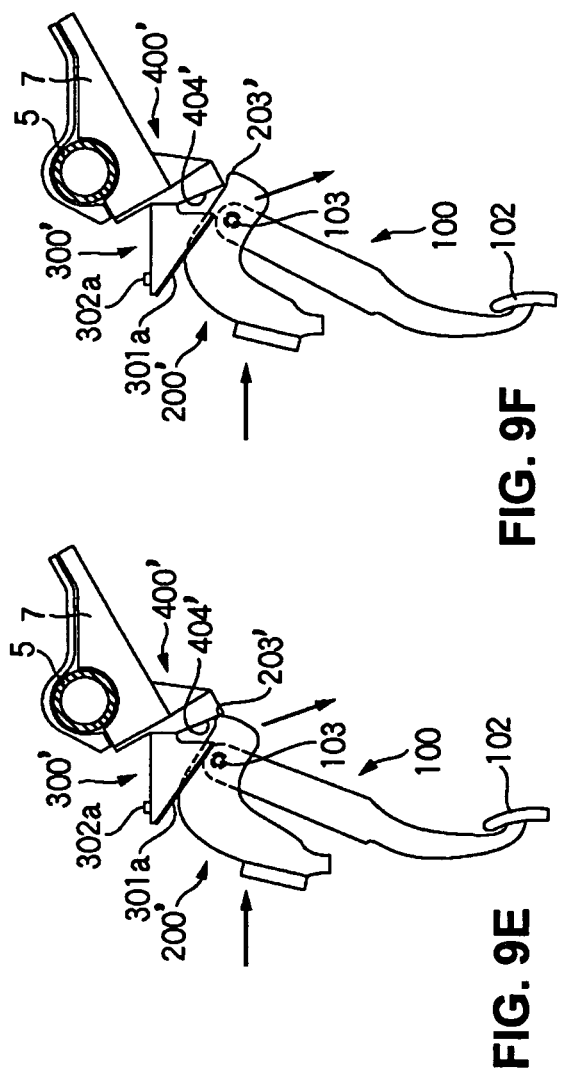
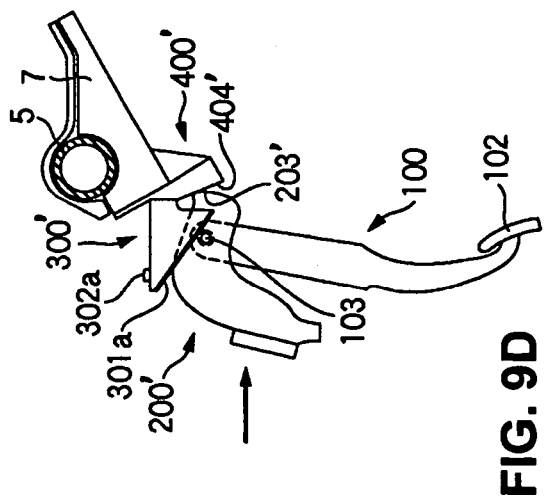

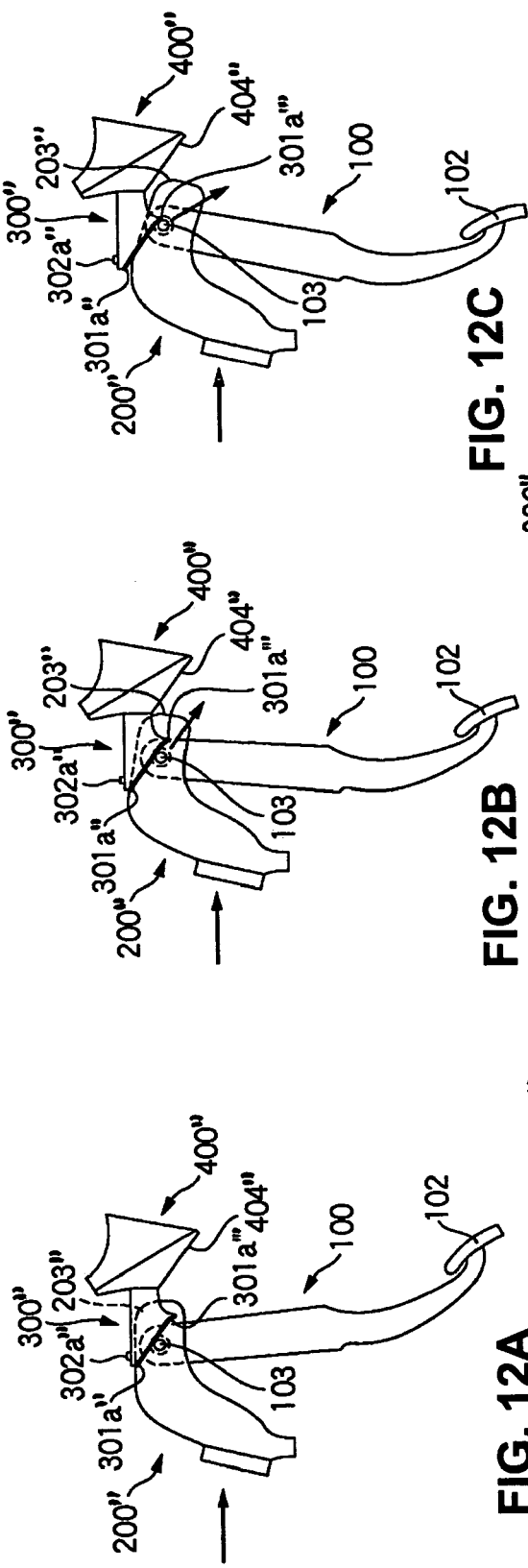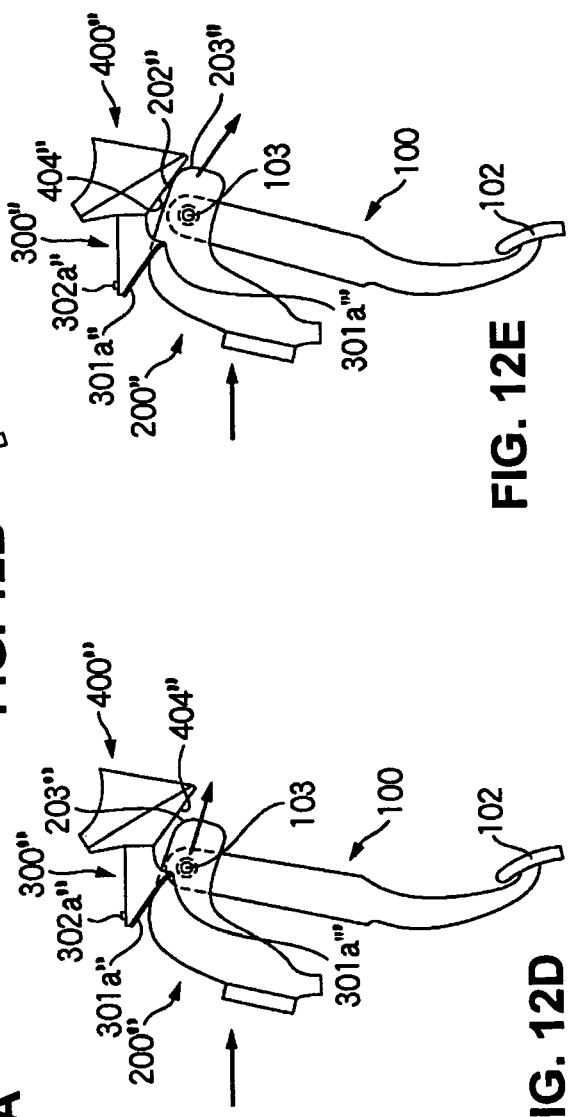

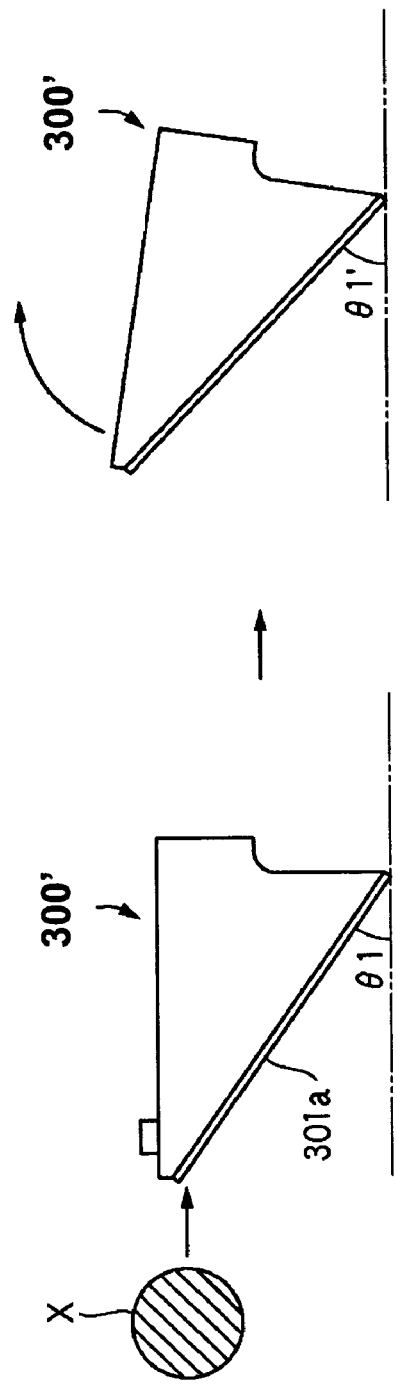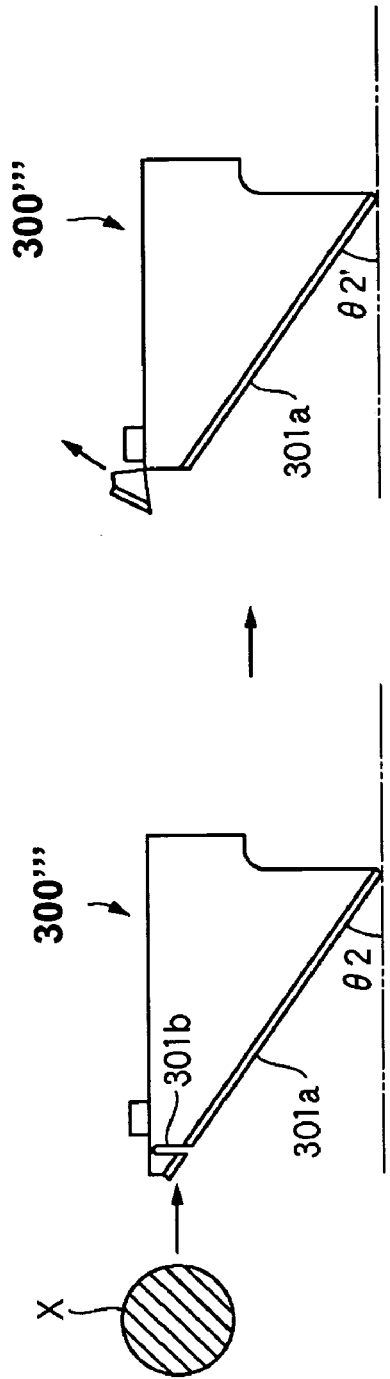
FIG. 14A
FIG. 14B

PEDAL SUPPORT STRUCTURE FOR VEHICLE

BACKGROUND OT THE INVENTION

The present invention relates to a pedal support structure for a vehicle, such as a brake pedal, and particularly a technology for a so-called collapsible pedal.

A vehicle frontal crash or the like may cause a vehicle front portion to collapse with a absorption of a crash energy, and a vehicle engine in an engine room may be moved backward thereby. In this case, a dash panel which separates the engine room from a cabin deforms backward, and a pedal, such as a brake pedal, which is provided behind the dash panel are also moved backward. As a result, a foot space for a driver becomes short, and thus it becomes easy for a foot of the driver pressing a pad portion of the pedal such as the brake pedal to interfere with a steering column and the like. Herein, a pedal support structure for an automotive vehicle is known as disclosed in, for example, U.S. Pat. No. 6,339,971, in which a pedal portion of, for example, the brake pedal is moved forward relatively with respect to a vehicle body when the dash panel deforms toward the cabin.

The above-described publication discloses a mechanism in which when a pedal bracket to rotatably support the pedal is moved backward, the pedal bracket is bent so as to change its position in such a manner that its pad portion is moved forward. In this mechanism, there are provided respectively a vehicle-body-side slide member at an instrument panel reinforcement which extends in a vehicle width direction in an instrument panel and a bracket-side slide portion at the pedal bracket, and when the pedal bracket is moved backward, the bracket-side slide portion slides on a guide face of the vehicle-body-side slide member, thereby changing the position of the pedal bracket. During sliding of the bracket-side slide portion, the pedal bracket changes its position while being bent, and a reaction force occurring during this time is born by the instrument panel reinforcement.

Also, the pedal bracket is fixed at two points of the dash panel and the vehicle-body-side slide member, and a fixation between the vehicle-body-side slide member and the pedal bracket is configured so as to be released when the pedal bracket has been moved backward, so that the pedal bracket can be allowed to be moved backward.

Namely, when the pedal bracket has been moved backward due to the vehicle crash, the bracket-side slide portion (hereinafter, referred to as "pedal bracket," simply) of the pedal bracket starts to slide on the guide face of the vehicle-body-side slide member, and then at a point where it has slid by a specified distance, the fixation of the pedal bracket and the vehicle-body-side slide member is released. And, as the pedal bracket slides on the guide face, the pedal bracket changes its position in such a manner that the pad portion of the pedal is moved relatively forward.

In the pedal support structure disclosed in the above-described publication, however, when a large impact load applied to the guide face acts on the instrument panel reinforcement extremely, there is a concern that the instrument panel reinforcement may be broken and the reaction force for bending the pedal bracket may not be born properly by the instrument panel reinforcement thereby. Accordingly, the pedal bracket may not be surely deformed to an expected great degree, its position may not be changed sufficiently, and the relative backward movement of the pad portion of the pedal may not be restrained properly.

Although structural reinforcing of the instrument panel reinforcement may be considered in order to avoid the above-described problem, this may improperly cause a large-sized and heavy structure. Meanwhile, it may be considered that a front-half portion of the guide face is set to be a relatively gentle grade in order to reduce the impact load applied to the instrument panel reinforcement. For example, in the structure disclosed in the above-described publication, the guide face of the vehicle-body-side slide member has a relatively gentle grade of its front-half portion in order to reduce the impact load to the instrument panel reinforcement and release smoothly the fixation of the pedal bracket, whereas it has a relatively steep grade of its rear-half portion in order to obtain a greater position change of the pedal bracket.

However, since the pedal support structure of the above-described publication tries to materialize such functions with a single guide face, the guide face thereof would be relatively long longitudinally and vertically and have less flexibility in the layout.

Also, although other pedal structures for a vehicle are known (see, for example, U.S. Pat. Nos. 6,327,930 and 6,481,311), these structures still do not solve the above-described problems properly.

SUMMARY OF THE INVENTION

The present invention has been devised in view of the above-described problems, and an object of the present invention is to provide a pedal support structure for a vehicle which can improve flexibility of the layout of the guide face to guide a position change of the pedal bracket and to make its structure compact.

This object is solved by a pedal support bracket for a vehicle according to the present invention of claim 1. Preferred embodiments of the present invention are subject of the dependent claims.

According to the present invention, there is provided a pedal support structure for a vehicle, comprising a pedal unit including a pedal with a pad portion, a pedal bracket to rotatably support the pedal, and first and second contact portions, a guide member supported at an instrument panel reinforcement of the vehicle and including first and second guide faces, the guide member being operative to guide the pedal unit, when the pedal bracket is moved backward, via a slide of the first contact portion on the first guide face and a slide of the second contact portion on the second guide face such that a position of the pedal unit changes in such a manner that the pad portion of the pedal is restrained from being moved backward, wherein the first and second contact portions and the first and second guide faces are configured such that the second contact portion comes to contact and slide on the second guide face after the first contact portion has started to slide on the first guide face as the pedal bracket is moved backward, the first and second contact portions are disposed separately in a longitudinal direction of the vehicle and the first and second guide faces are disposed separately in the longitudinal direction of the vehicle, the first and second contact portions are located so as to be offset from each other in a vehicle width direction and the first and second guide faces are located so as to be offset from each other in the vehicle width direction as well corresponding to locations of the first and second contact portions, whereby the first and second contact portions and the first and second guide faces can be located substantially horizontally.

According to this pedal support structure, the slide comprises two slide portions constituted of the first and second contact points and the first and second guide faces, and the second contact portion comes to contact and slide on the second guide face after the first contact portion has started to slide on the first guide face. Accordingly, for example, the first guide face may be configured so that an impact load applied to the instrument panel reinforcement from the pedal unit can be reduced and an initial deformation of the pedal bracket can occur. Meanwhile, the second guide face may be configured so that an expected deformation of the pedal bracket can occur surely and the pad portion can be surely restrained from moving backward. Thus, these guide faces can be set properly and separately according to purposes of the function thereof, and the flexibility of layout can be improved thereby.

Further, the first and second contact portions are disposed separately in the longitudinal direction of the vehicle, the first and second guide faces are disposed separately in the longitudinal direction of the vehicle, the first and second contact portions are located so as to be offset from each other in the vehicle width direction and the first and second guide faces are located so as to be offset from each other in the vehicle width direction as well corresponding to locations of the first and second contact portions, whereby the first and second contact portions and the first and second guide faces can be located substantially horizontally. Accordingly, an unexpected situation where the first contact portion contacts the second guide face or the second contact portion contacts the first guide face can be avoided. Further, a longitudinal length of these parts can be made short, and a vertical space thereof can be also made small by the above-described substantially horizontal disposition. As a result, an extremely compact structure can be attained as a whole accordingly.

Also, this substantially horizontal disposition can provide a longer length of the pedal bracket in the longitudinal direction of the vehicle. Herein, such a longer length of the pedal bracket should be advantageous in facilitating bending of the pedal bracket because the impact load acts substantially longitudinally. Further, the pedal bracket is fixed via two fixing points which are away from each other in the longitudinal direction of the vehicle, so that the pedal bracket can be fixed stably during the normal state.

According to a preferred embodiment, either one of the first and second contact portions is provided at the pedal bracket and the other one of the first and second contact portions is provided at the pedal.

According to this structure, the pedal bracket and the support structure as a whole can be made compact. Namely, since only the one of the contact points is applied to the pedal bracket and thus there can be provided a high rigidity portion only for this contact point, the pedal bracket does not necessarily require high rigidity as a whole and therefore it can be made compact as much as possible. Further, the pedal bracket can be configured so as to be bent by an even smaller load. Herein, since the pedal is originally designed to have a high rigidity, providing only the contact point of the other of the contact points having a high rigidity to the pedal may not bring a large-sized structure.

Also, according to another preferred embodiment, the pedal bracket includes a rear end portion and a front end portion which is fixed to a dash panel, the pedal includes an upper end portion which is supported at the rear end portion of the pedal bracket via an axis and a lower end portion at which the pad portion is provided, and the first contact portion is formed at part of the axis and the second contact portion is formed at a rear end face of the rear end portion of the pedal bracket.

According to this structure, since the first and second contract portions are provided at the rear end of the pedal bracket, these are located closely and further compactness can be attained thereby. Further, since the pedal bracket receives the load at its both ends, the greater bending moment can be applied to the pedal bracket and the bending of the pedal bracket can be facilitated thereby. Further, since the second contact portion is located more far from the front end portion of the pedal bracket, which is fixed to the dash panel, than the first contact portion, much greater bending moment can be applied to the pedal bracket when the second contact portion slides on the second guide face. Accordingly, the pedal bracket can be surely deformed to an expected great degree.

Also, according to another preferred embodiment, the rear end face of the pedal bracket includes a curved face which is continuous to an upper end face of the rear end portion of the pedal bracket.

According to this structure, after the rear end face as the second contact portion has slid on the second guide face, the upper end face of the pedal bracket subsequently slides on the second guide face. Accordingly, since a long sliding distance on the second guide face is provided, a further compact structure can be obtained. Also, since the rear end face of the pedal bracket includes the curved face which is continuous to the upper end face, the upper end face can smoothly slide on the second guide face after the rear end face has slid on the second guide face.

Also, according to another preferred embodiment, the guide member includes a fixing portion which fixes the pedal bracket thereto in such a manner that the first and second contact portions are separate from the first and second guide faces during a normal state, whereas the pedal bracket is allowed to be moved backward when a specified great load is applied to the pedal bracket backward, and the pedal bracket is fixed at the fixing portion and a dash panel of the vehicle.

Further, according to another preferred embodiment, the guide member includes a first guide member having the above-described first guide face and a second guide member having the above-described second guide face, and the first guide face is configured such that a direction perpendicular to the first guide face in an initial contact position does not pass an axis center of the instrument panel reinforcement, whereas the direction perpendicular to the first guide face gradually gets close to the axis center of the instrument panel reinforcement as the first contact portion slides on the first guide face.

According to this structure, since the first guide face is arranged such that the direction perpendicular to the first guide face in the initial contact position of the first contact portion does not pass the axis center of the instrument panel reinforcement, the impact load against the instrument panel reinforcement can be reduced properly and a bending moment can be made small thereby. Namely, since a segment of the impact load which is parallel to the first guide face is negligibly small, compared to a segment thereof which is perpendicular to the face, the direction of the impact load becomes a direction substantially perpendicular to the first guide face. Accordingly, by arranging such that the impact load does not pass the axis center of the instrument panel reinforcement, the impact load can be reduced and the bending moment causing breakdown or the like can be made small thereby. Thus, the instrument panel reinforcement can be prevented from being broken properly, without structural reinforcing of the instrument panel reinforcement or providing a particularly gentle grade of the first guide face.

Also, since the first guide face is arranged such that the direction perpendicular to the first guide face gradually gets close to the axis center of the instrument panel reinforcement as the first contact portion slides on the first guide face, bending of the pedal bracket can be promoted further later on. Namely, in the initial stage, the impact load against the instrument panel reinforcement can be reduced as described above, and then the load which the first guide face receives from the first contact can be born by the instrument panel reinforcement properly. Thus, an initial deformation of the pedal bracket can be generated surely by the first guide face, and subsequently the pedal bracket can be deformed to an expected great degree by the second guide face, thereby surely restraining the pad portion of the pedal from moving backward relatively. Namely, according to this embodiment, flexibility of a layout of the guide faces can be improved, the instrument panel reinforcement can be restrained from being broken by reducing properly the impact load against it when the impact load is applied, and the pedal bracket can be deformed surely to the expected great degree, thereby restraining the pad portion of the pedal from moving backward relatively.

Also, according to another preferred embodiment, the second guide face is configured such that an offset value between a direction perpendicular to the second guide face in a specified contact position and the axis center is smaller than an offset value between the direction perpendicular to the first guide face in the initial contact position and the axis center.

According to this structure, the impact load against the instrument panel reinforcement is reduced in the initial contact position of the first guide face, whereas the load acting on the instrument panel reinforcement during a slide of the second contact portion on the second guide face gets closer to the axis center than in the initial contact position. Accordingly, the load which the second guide face receives from the second contact portion can be born by the instrument panel reinforcement properly, and the pedal bracket can be surely deformed to the expected great degree.

Also, according to another preferred embodiment, the first guide face is configured so as to slant rearward and downward and such that the above-described direction perpendicular to the first guide face in the initial contact position passes above the instrument panel reinforcement.

According to this structure, since the direction perpendicular to the first guide face in the initial contact position passes above the instrument panel reinforcement, the direction passes far from the axis center and the bending moment against the instrument panel reinforcement can be made much smaller thereby. Also, since the first guide face is configured so as to slant rearward, the direction perpendicular to the first guide face at respective portions moves downward substantially in parallel toward the axis center, passing through the instrument panel reinforcement, as the first contact portion slides. Thus, the instrument panel reinforcement can properly bear the load which the first guide face receives from the first contact portion, and bending of the pedal bracket can be promoted further.

Also, according to another preferred embodiment, the second guide face is configured such that the direction perpendicular to the second guide face in a specified contact position passes through the instrument panel reinforcement.

According to this structure, since the load which the second guide face receives from the second contact portion acts on the cross section of the instrument panel reinforcement during the slide of the second contact portion on the second guide face, the instrument panel reinforcement can properly bear the load, and the pedal bracket can be deformed to the expected great degree further surely.

Also, according to another preferred embodiment, the first guide member includes an attaching face, and a grade of the attaching face is configured such that when a specified load is applied to the first guide face from the first contact portion, the first guide member is slid in a substantially vertical direction of the vehicle.

According to this structure, since the first guide member is slid in the substantially vertical direction of the vehicle when the specified load is applied to the first guide face, the impact load against the instrument panel reinforcement can be reduced and a control of the first guide member being slid can be attained properly by adjusting the grade of the attaching face.

Further, according to another preferred embodiment, the first contact portion is configured so as to go away from the first guide face by the second contact portion sliding on the second guide face.

According to this structure, since the first contact portion is configured so as to go away from the first guide face by the second contact portion sliding on the second guide face, it can be avoided that the first and second contact portions engage with the first and second guide faces. Accordingly, a transition from an one slide portion to the other slide portion can be made smoothly.

Also, according to another preferred embodiment, the first guide face and second guide face are configured so as to slant backward and downward respectively and such that a distance therebetween gradually becomes smaller while going downward, and a distance between the first contact portion and second contact portion is configured so as to be substantially constant.

According to this structure, since the distance between the first and second guide faces gradually becomes smaller while going downward, and the distance between the first and second contact portions is configured so as to be substantially constant, there occurs a difference between the distance of the first and second contact portions and the distance of the first and second guide faces as the second contact portion slides on the second guide face. Accordingly, a relative displacement of the first contact portion going away from the first guide face can be attained by a relatively simple structure of the second contact portion sliding on the second guide face.

Also, according to another preferred embodiment, the first guide face and the second guide face are configured so as to slant backward and downward respectively in parallel to each other, and the second contact portion is configured such that a surface thereof is formed of an arc-shaped face having gradually changing distance from the first contact portion as the second contact portion slides on the second guide face.

According to this structure, since the second contact portion is configured such that its surface is formed of the arc-shaped face having gradually changing distance from the first contact portion as the second contact portion slides on the second guide face, there occurs a difference between the distance of the first and second contact portions and the distance of the first and second guide faces as the second contact portion slides on the second guide face. Accordingly, the relative displacement of the first contact portion going away from the first guide face can be attained by the relatively simple structure of the second contact portion sliding on the second guide face.

Further, according to another preferred embodiment, the first and second contact portions and the first and second guide faces are configured such that the first contact portion slides on the first guide face when the pedal bracket is moved backward, and the second contact portion comes to contact the second guide face after the first contact portion has gone away from the first guide face, and a terminal end portion of the first guide face includes a slant portion which reduces an approaching speed of the second contact portion to the second guide face when the first contact portion goes away from the first guide face.

According to this structure, since first the first contact portion slides on the first guide face and then the second contact portion comes to contact the second guide face after the first contact portion has gone away from the first guide face, it can be avoided that the both contact portions engage concurrently. Also, since there is provided the slant portion which reduces the approaching speed of the second contact portion to the second guide face when the first contact portion goes away from the first guide face, it can be avoided that the second contact portion hits against the second guide face violently, and the transition from one slide portion to the other slide portion can be made further smoothly.

Also, according to another preferred embodiment, the first guide face is disposed backward with respect to the first contact portion and the second guide face is disposed backward with respect to the second contact portion, the first and second contact portions are configured so as to slant backward and downward, and a grade of the slant portion is configured so as to be more vertical than that of other portion of the first guide face.

According to this structure, since the grade of the slant portion is configured so as to be more vertical than that of other portion of the first guide face, the backward approaching speed of the second contact portion can be reduced properly, and the first contact portion can slide on the slant portion smoothly.

Herein, the above-described guide member may include the fixing portion which fixes the pedal bracket thereto in such a manner that the first and second contact portions are separate from the first and second guide faces during the normal state, whereas the pedal bracket is allowed to be moved backward when the specified great load is applied to the pedal bracket backward, and the pedal bracket is fixed at the fixing portion and the dash panel of the vehicle.

Further, according to another preferred embodiment, there is further provided the fixing portion which fixes the pedal bracket thereto in such a manner that the first and second contact portions are separate from the first and second guide faces during the normal state, whereas the pedal bracket is allowed to be moved backward when the specified great load is applied to the pedal bracket backward, the first guide face includes a front end portion which extends upward from the first contact portion, and there is provided a restraint structure at the front end portion which restrains a grade of the first guide face from changing to being more vertical when a vehicle component hits against the front end portion.

According to this structure, since the pedal bracket is fixed at the fixing portion in such a manner that the first and second contact portions are separate from the first and second guide faces during the normal state, the fixation of the pedal bracket can be released smoothly when the pedal bracket is moved backward. And, since the restraint structure is provided at the front end portion, the first guide face can be restrained from changing to being more vertical properly even if an unexpected vehicle component or the like hits against the front end portion. Namely, it can be avoided that the extremely large impact load acts on the instrument panel reinforcement by the first guide face changing to being more vertical.

Accordingly, according to the pedal support structure of this preferred embodiment, it can be avoided properly that the extremely large impact load is applied to the instrument panel reinforcement, which may be caused by the front end portion extending of the first guide face during the hit of the unexpected vehicle component or the like against the front end portion.

Also, according to another preferred embodiment, the restraint structure is configured such that the front portion is made weaker than any other portion of the first guide member, whereby the front end portion can be broken by the hit of the vehicle component.

According to this structure, since the front end portion is broken when the unexpected vehicle component or the like hits against the front end portion, the grade of the first guide face is restrained from becoming more vertical, so that it can be avoided properly that the extremely large impact load is applied to the instrument panel reinforcement.

Also, according to another preferred embodiment, the restraint structure comprises a notch, whereby the front end portion can be broken by the hit of the vehicle component.

According to this structure, the structure for breakage of the front end portion during the hit of the unexpected vehicle component or the like against the front end portion can be materialized more simply.

Also, according to another preferred embodiment, the restraint structure comprises a slant face which is configured such that the load caused by the hit of the vehicle component acts against the first guide member so as to change the grade of said first guide faces in a specified direction to be more horizontal.

According to this structure, an acting direction of the impact load, which is applied to the first guide member when the unexpected vehicle component or the like hits against the front end portion, can be controlled, so that the grade of the first guide face can be changed to being horizontal.

Namely, it can be avoided that the extremely large impact load acts on the instrument panel reinforcement by the first guide face changing to being more vertical.

Herein, the fixing portion can be provided at the first guide member, and the pedal bracket can be fixed at the fixing portion and the dash panel of the vehicle.

Other features, aspects and advantages of the present invention will become apparent from the following description which refers to the accompanying drawings.

BRIEF DESCRIPTION OF THE DRAWINGS

FIGS. 5A through 5E are explanatory diagrams of function of the pedal support structure A.

FIGS. 7A and 7B are explanatory diagrams of function that the first guide member 300 is slid in a vertical direction of the vehicle.

FIGS. 9A through 9F are explanatory diagrams of function of the pedal support structure A of FIG. 8.

FIGS. 12A through 12E are explanatory diagrams of function of the pedal support structure A of FIG. 11.

FIGS. 14A and 14B are diagrams illustrating function of a restraint structure of the first guide member.

DETAILED DESCRIPTION OF THE INVENTION

Figure 1:
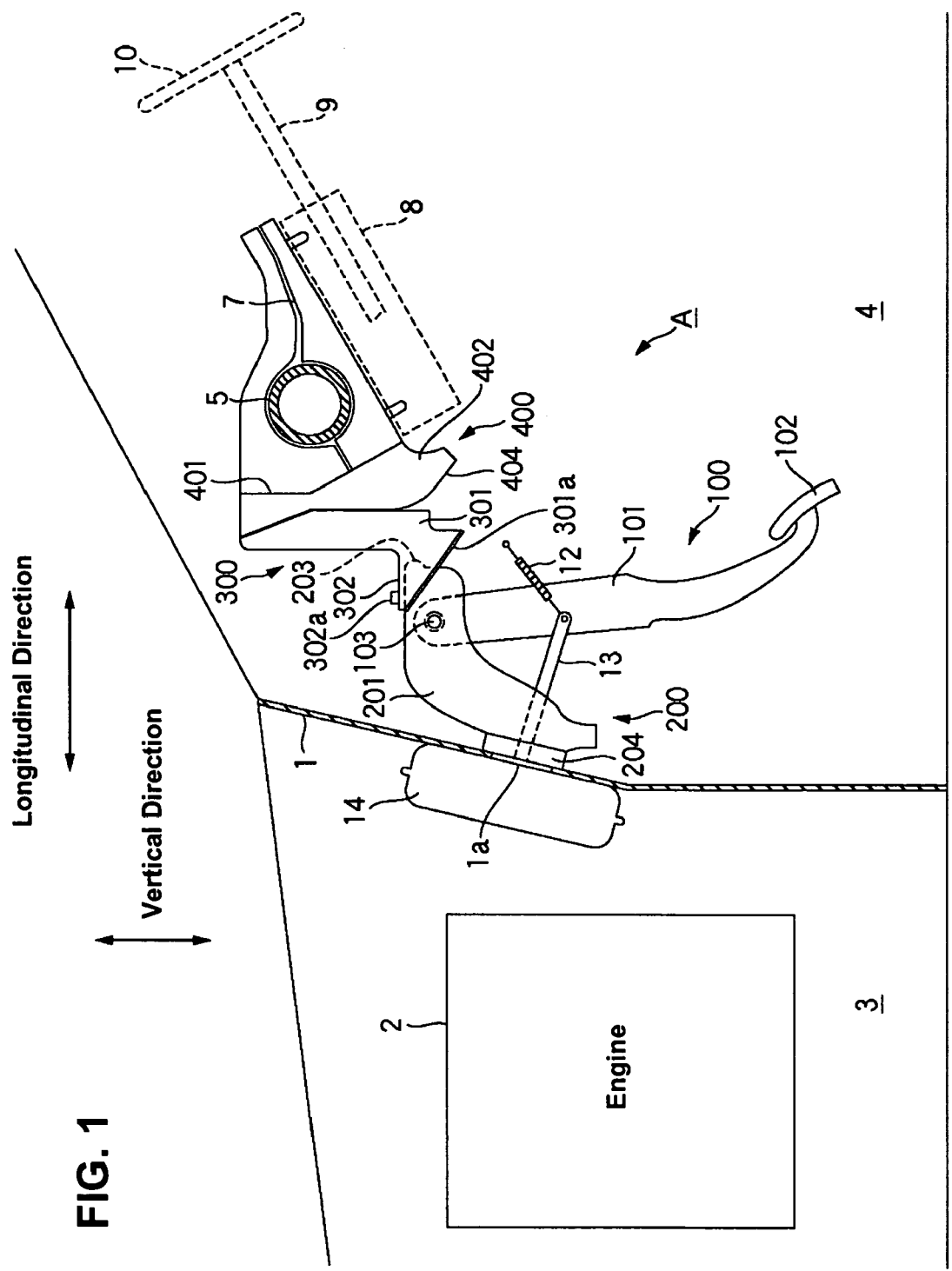
FIG. 1 is a schematic view of a pedal support structure A according to an embodiment of the present invention.
Figure 2:
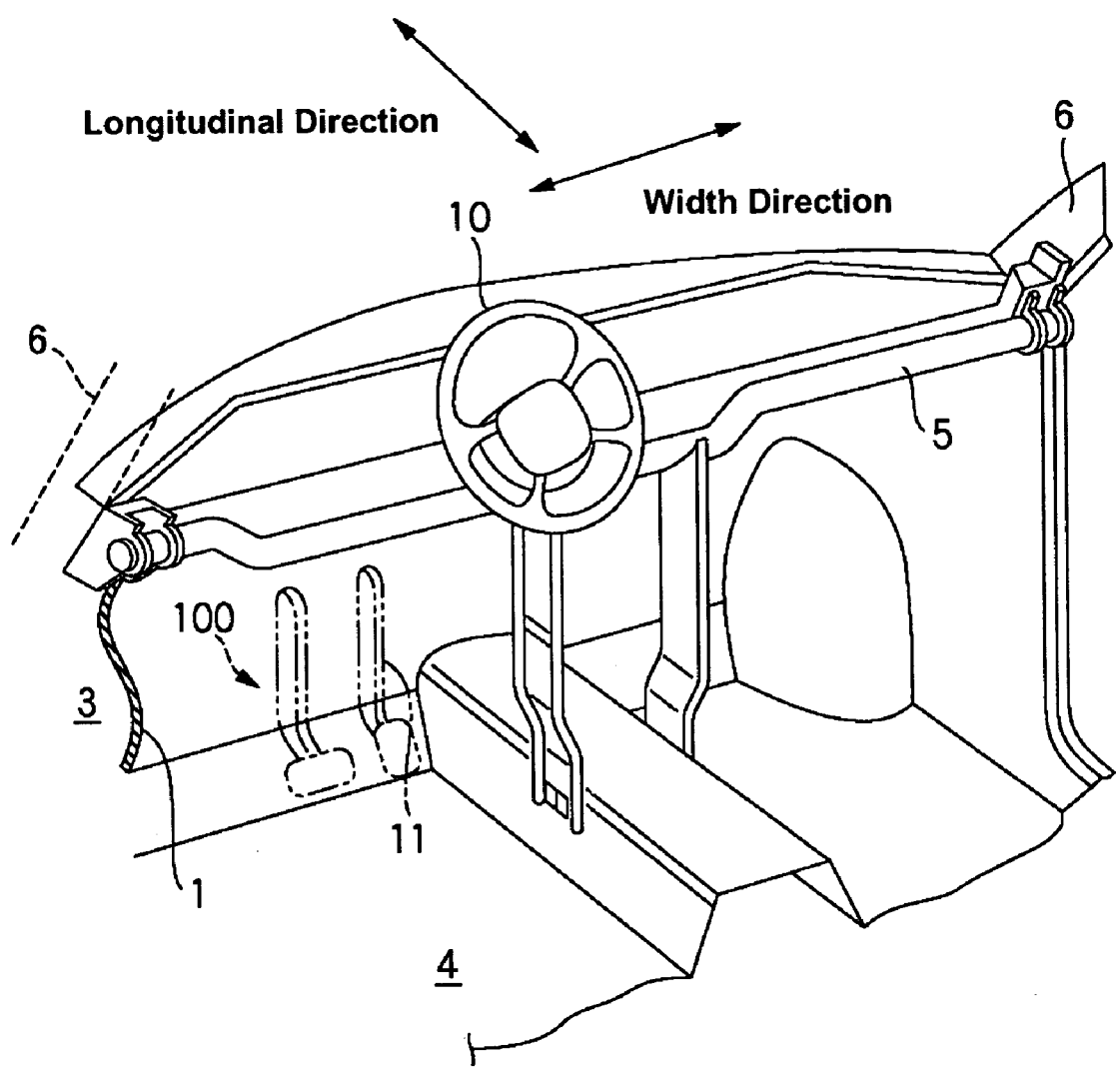
FIG. 2 is a schematic view of a front portion of a cabin in a vehicle with a left-side steering wheel, which is equipped with the pedal support structure A.

Hereinafter, preferred embodiments of the present invention will be described with reference to the accompanying drawings. It should be understood that even though embodiments are separately described, single features thereof may be combined to additional embodiments. FIG. 1 is a schematic view of a pedal support structure A according to an embodiment of the present invention. FIG. 2 is a schematic view of a front portion of a cabin in a vehicle with a left-side steering wheel, which is equipped with the pedal support structure A. A dash panel 1 is provided to separate an engine room 3 for an engine 2 from a cabin 4. An instrument panel reinforcement 5 extends in a vehicle width direction in an instrument panel (not illustrated) which is located in rear of the dash panel 1, and some parts in the instrument panel are supported at the instrument panel reinforcement 5. The instrument panel reinforcement 5 is supported by a pair of front pillars 6 provided at both sides of a vehicle body. Also, a hanger bracket 7 to support a steering column 8 is attached to the instrument panel reinforcement 5. A steering shaft 9 is provided in the steering column 8 and equipped with a steering wheel 10 at its tip. Below the hanger bracket 7 are provided an accelerator pedal 11 and a brake pedal 100. The pedal support structure A according to the present embodiment is applied to the brake pedal 100.

Figure 3:
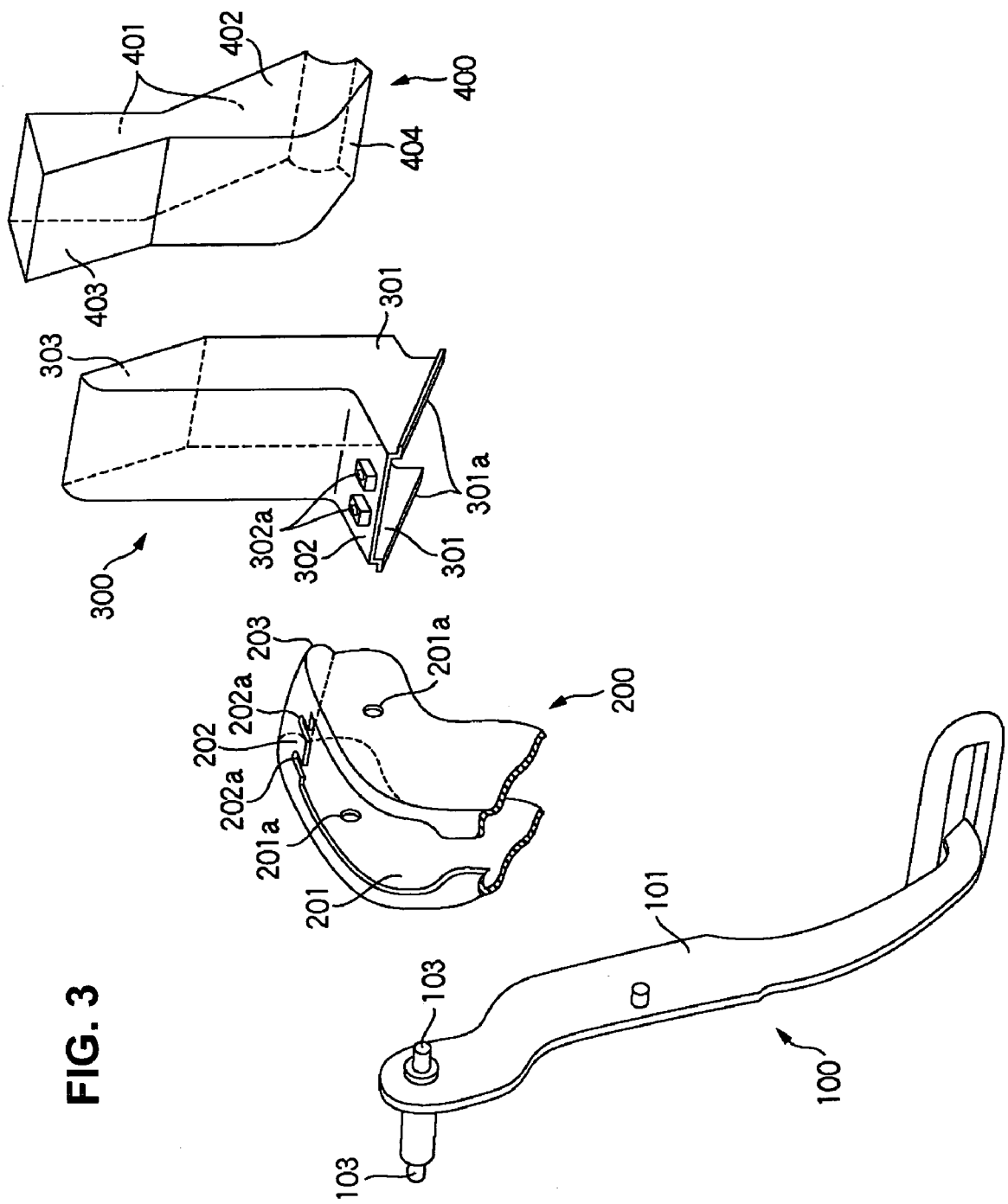
FIG. 3 is an exploded (partially sectional) view of parts of the pedal support structure A.

A detailed structure of the pedal support structure A will be described referring to FIGS. 1 and 3. FIG. 3 is an exploded (partially sectional) view of parts of the pedal support structure A. The pedal support structure A comprises the brake pedal 100, a pedal bracket 200 to rotatably support the brake pedal 100, which constitute a brake pedal unit. The brake pedal 100 includes an arm portion 101 and a pad portion 102 attached to a lower end portion of the arm portion 101. The pedal 100 is rotatably supported at the pedal bracket 200 via an axis 103 at its upper end, and it swings longitudinally when a driver presses the pad portion 102. In the present embodiment, the axis 103 is integrally fixed to the arm portion 101 and inserted in holes 201a formed at the pedal bracket 200, which constitutes supporting the pedal 100.

One tip of a return spring 12 is hooked at a center portion of the arm portion 101. The return spring 12 provides a counterclockwise rotational force to the pedal brake 100 as illustrated in FIG. 1, and the pad portion 102 is returned backward after the driver presses it thereby. Also, one tip of an operating rod 13 is rotatably attached to the center portion of the arm portion 101. The operating rod 13 gets through a hole 1a formed at the dash panel 1, and the other tip thereof is coupled to a master cylinder (not illustrated) in the engine room 3 via a master back 14. When the driver presses the pedal portion 102 and the brake pedal 100 is rotated clockwise in FIG. 1, the master back 14 acts by the operating rod 13 pushed to increase a pushing force of the master cylinder. Accordingly, a brake force is applied to wheels by an oil pressure from the master cylinder.

The pedal bracket 200 comprises a pair of side plate portions 201 which are disposed away from each other in the vehicle width direction, an upper plate portion 202 which is formed at an upper and rear portion of the side plate portions 201, a rear end face 203 which is formed at a rear end portion of the side plate portions 201, and a front end portion 204 which is formed at a front portion of the side plate portions 201. The pedal bracket 200 is fixed to the dash panel 1 at the front end portion 204. The pedal bracket 200 is fixed to the dash panel 1 in such a manner, for example, that the dash panel 1 is sandwiched between the front end portion 204 and the master back 14 and the pedal bracket 200 is fastened to the master back 14 via bolts or the like. Next, holes 201a are formed respectively at rear portions of the side plate portions 201 to have the axis 103 of the brake pedal 100 insert therein, and the upper portion of the arm portion 101 of the brake pedal 100 is disposed between the side plate portions 201. Also, the axis 103 is disposed so as to extend outward by a specified amount from the side plate portions 201, which constitute a contact portion which will be described in detailed below. The rear end face 203 includes an arc-shaped curved face which is continuous to an upper end face of the upper plate portion 202. This rear end face 203 also constitutes another contact portion which will be described below. Two slots 202a, which have open ends at their fronts, are formed at the upper plate portion 202. The pedal bracket 200 is fixed to a first guide member 300, which constitutes a guide member, via the slots 202a as described in detail below. Namely, the pedal bracket 200 of the present embodiment is fixed at two points of the dash panel 1 and the first guide member 300.

The first guide member 300, which is located in rear of the pedal bracket 200, comprises a pair of side plate portions 301 which are disposed away from each other in the vehicle width direction, a ledge portion 302, and an attaching face 303 which is formed at an upper and rear portion of the side plate portions 301 for an attachment to a second guide member 400. The attaching face 303 is configured such that a direction of its face extends in the vehicle width direction and slant with a longitudinal direction of the vehicle by a specified angle. In the present embodiment, the attaching face 303 is disposed slant downward as illustrated in the figures. Both edges of the side plate portions 301 are bent outward and these bent portions constitute first guide faces 301a at their lower faces. The fist guide faces 301a function as guide faces, on which the above-described axis 103, as the first contact portion, slides, when the pedal bracket 200 is moved backward during a vehicle frontal crash or the like. In the present embodiment, the first guide faces 301a are located behind the axis 103 in its original position and formed to extend straightly and obliquely, rearward and downward. The pair of side plate portions 301 are formed with an distance laterally, and therefore there is formed a space between the side plate portions 301 which has an open downward. Accordingly, a rear part of the pedal bracket 200 including the rear end face 203 is located inside and between the side plate portions 301 of the first guide member 300.

Figure 4B:
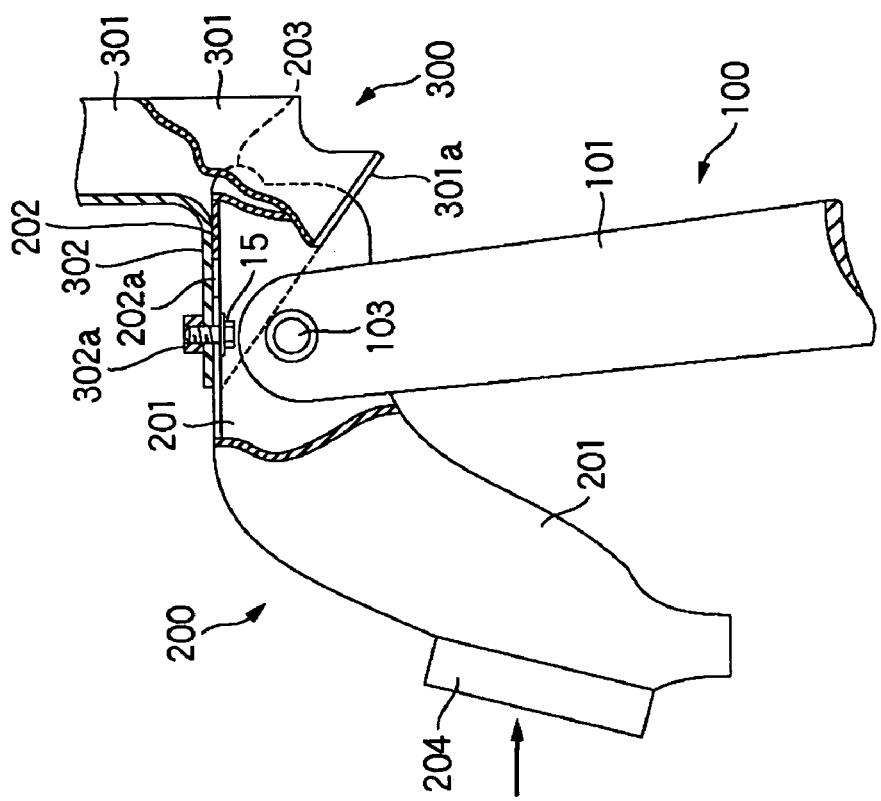
FIG. 4B is a sectional view illustrating function in a state in which the fixed pedal bracket 200 is released via the first guide member 300 from a state illustrated in FIG. 4A.
Figure 4A:
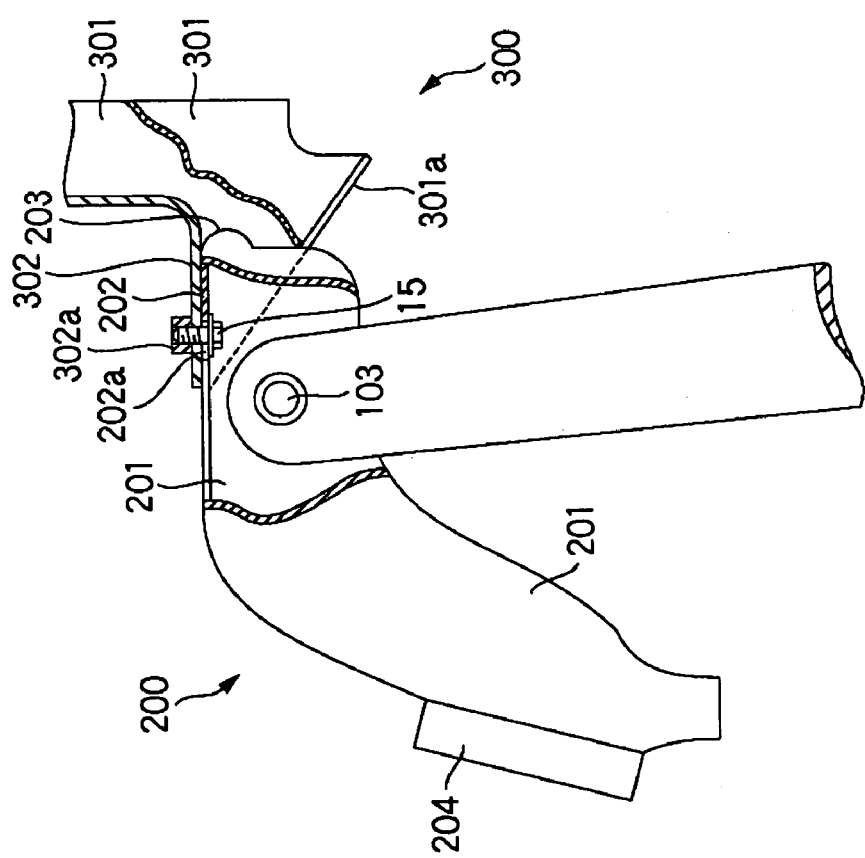
FIG. 4A is a sectional view illustrating a fixing structure of a pedal bracket 200 via a first guide member 300 during a normal state.

Next, at the ledge plate portion 302 of the first guide member 300 are provided fixing portions 302a to fix the pedal bracket 200. Hereinafter, a fixing structure of the pedal bracket 200 via the first guide member 300 will be described referring to FIG. 4A. FIG. 4A is a partial sectional view illustrating the fixing structure of the pedal bracket 200 via the first guide member 300 during a normal state (i.e., in a state where the vehicle frontal crash or the like do not occur). Screw holes are formed at the fixing portions 302a and the ledge plate portion 302 below the fixing portions 302a so as to penetrate them vertically.

The upper plate portion 202 of the pedal bracket 200 is positioned below the ledge plate portion 302 of the first guide member 300 in such a manner that the slots 202a of the pedal bracket 200 are located just below the fixing portions 302a, and two bolts 15 are inserted from below the upper plate portion 202 of the pedal bracket 200 into the respective slots 202a and the holes of the ledge plate portion 302. Then, the bolts 15 are screwed into the screw holes of the fixing portions 302a and fastened, thereby fixing the pedal bracket 200 to the first guide member 300. Also, the pedal bracket 200 is fixed, as illustrated in the figures, with no contact between the axis 103 of the first contact portion and the guide faces 301a, i.e., separately from each other, in the present embodiment. Herein, the rear part of the pedal bracket 200 is located between the side plate portions 301 of the first guide member 300.

Next, function of releasing a fixation of the pedal bracket 200 via the first guide member 300 will be described referring to FIG. 4B. FIG. 4B is a sectional view illustrating function in a state in which the fixed pedal bracket 200 is released via the first guide member 300 from a state illustrated in FIG. 4A. When a load is applied to the pedal bracket 200 backward as illustrated by an arrow in the figure, the pedal bracket 200 will move backward with respect to the first guide member 300. Herein, the pedal bracket 200 is basically restrained from moving backward by the fastening between the bolts 15 and the fixing portions 302a. However, since the slots 202 have their open front ends, when the load applied to the pedal bracket 200 is large enough to exceed a specified value, the pedal bracket 200 is pushed backward relatively with respect to the first guide member 300 in such a manner that the upper plate portion 202 of the pedal bracket 200 slides below the ledge plate portion 302.

Then, the bolts 15 pass away from the slots 202a, and accordingly the fixation of the pedal bracket 200 via the first guide member 300 is fully released. Since the pedal bracket 200 is fixed originally with no contact between the axis 103 and the guide faces 301a, separately from each other, in the present embodiment as described above, the first guide faces 301a do not restrain the pedal bracket 200 from moving backward for releasing the fixation of the pedal bracket 200. Thus, the fixation of the pedal bracket 200 can be released surely. A proper separated distance between the axis 103 and the guide faces 301a may be set to a certain distance, for example, where the bolts 15 has just passed away from the slots 202a when the axis 103 comes to contact the first guide faces 301a. Thus, the present embodiment is configured so that the pedal bracket 200 can be fixed temporarily via the first guide member 300 during the normal state, whereas the pedal bracket 200 can be allowed to move backward when the large enough load applied to the pedal bracket 200. Herein, the pedal bracket 200 may be fixed originally with the contact between the axis 103 and the guide faces 301a.

Next, returning to FIGS. 1 and 3, the second guide member 400 will be described. The second guide member 400, which is located in rear of the first guide member 300 with respect to the pedal bracket 200, comprises an attaching face 401 which is formed backward for the hanger bracket 7, a pair of side plate portions 402 which are disposed away from each other in the vehicle width direction, an attaching face 403 which is formed forward for an attachment to the first guide member 300, and a second guide face 404 which is formed forward. The attaching face 403 is formed with a slant face like the attaching face 303 of the first guide member 300.

The second guide face 404 functions as a guide face, on which the above-described rear end face 203 of the pedal bracket 200, as a second contact portion, slides, when the pedal bracket 200 is moved backward during the vehicle frontal crash or the like. In the present embodiment, the second guide face 404 is located behind the first rear end face 203 in its original position and formed to extend straightly and obliquely, rearward and downward. Also, the second guide face 404 is provided just behind the first guide faces 301a so that they are located closely in the longitudinal direction of the vehicle. Thus, a longitudinal space for disposing the first and second guide faces 301a and 404 can be shortened as much as possible, and a compact structure can be attained thereby.

Herein, a layout of these parts is configured in such a manner that when the pedal bracket 200 moves backward relatively with respect to the vehicle body, at first the axis 103 contacts the first guide faces 301a to slide, and then the rear end face 203 contacts the second guide face 404 to slide in the middle of or after the sliding of the first guide faces 301a on the first guide faces 301a. Namely, the present embodiment can provide a two-stage position change of the pedal unit by making use of the two guide faces 301a and 404.

The two guide faces 301a and 404 may be configured so as to have substantially the same slant angle. Also, the first guide faces 301a may be configured so as to extend substantially horizontally so that an initial deformation of the pedal bracket 200 can occur and a large impact load will not act on the instrument panel reinforcement 5 excessively at the time of contacting of the axis 103. Meanwhile, the second guide face 404 may be configured so as to extend relatively vertically so that an expected deformation of the pedal bracket 200 can occur surely and the pad portion 102 can be surely restrained from moving backward. The angle of these guide faces can be set properly according to purposes of the function thereof. As described above, the present embodiment can increase flexibility of the layout by providing two sets of contact portions (the axis 103 and the rear end face 203) and guide faces (the first guide faces 301a and the second guide face 404), compared to a case where there are provided one set of contact portion and guide face. Particularly, the guide face having a longer sliding distance with a shorter vertical length can be obtained. Setting the respective positions of the two guide faces can increase the layout flexibility further.

Also, in the present embodiment, the axis 103 and the rear end face 203 are disposed separately in the longitudinal direction of the vehicle, and the first guide faces 301a and the second guide face 404 are also disposed separately in the longitudinal direction of the vehicle. Further, portions of the axis 103 which respectively contact the first guide faces 301a (portions of the axis 103 which project from the side plate portions 201 of the pedal bracket 200) are located at the left and right sides of the rear end face 203, when viewed from the front. Accordingly, the contact portions of the axis 103 with the first guide faces 301a and the rear end face 203 are located so as to be offset from each other in the vehicle width direction. The first guide faces 301a are located at the left and right sides of the second guide face 404, corresponding to the contact portions of the axis 103 and the rear end face 203 respectively, and thus these are also located so as to be offset from each other in the vehicle width direction.

Advantages of the above-described structure will be described. First, when the pedal bracket 200 is moved backward during the vehicle frontal crash or the like, the axis 103 and the rear end face 203 will move in the same direction (in the longitudinal direction of the vehicle). Herein, an unexpected situation where the axis 103 contacts the second guide face 404 or the rear end face 203 contacts the first guide faces 301a can be avoided. Also, a compact layout in the longitudinal direction may be provided according to the above-described structure. Further, the axis 103, rear end face 203, first guide faces 301a, and second guide face 404 can be located substantially horizontally and straightly as illustrated in the figure. Accordingly, respective vertical level positions of the axis 103, rear end face 203, and second guide face 404 can be located within a vertical disposition scope of the first guide faces 301a. Thus, a compact layout even in the vertical direction may be provided, and the structure can be made extremely compact as a whole. Herein, even if the second guide face 404 may be located partially out of the vertical disposition scope of the first guide faces 301a (for example, an upper or lower end of the second guide face 404 is partially out of the vertical disposition scope of the first guide faces 301a in FIG. 1) instead of that being located fully within this scope as illustrated in the figure, such a partially-overlapped disposition can also improve a compactness of the structure. Thus, this case can be also said that the axis 103, rear end face 203, first guide faces 301a, and second guide face 404 are located substantially horizontally.

Also, the above-described substantially horizontal disposition can provide a longer length of the pedal bracket 200 in the longitudinal direction of the vehicle. When the vehicle frontal crash or the like occurs, the pedal bracket 200 receives the impact load substantially longitudinally from its front end portion 204. At the same time, it receives a reaction force from the first guide faces 301a or the second guide face 404 via the axis 103 or the rear end face 203. As a result, a bending moment is applied to the pedal bracket 200. Herein, according to the longer length of the pedal bracket 200 as described above, a distance between a point to which the impact load is applied and a point to which a reaction force is applied becomes longer, and thus a greater bending moment comes to act on the pedal bracket 200. As a result, bending of the pedal bracket 200 can be facilitated. Further, as illustrated in FIG. 1 and other figures, the pedal bracket 200 is fixed via fixing points of the dash panel 1 and the fixing portions 302a, and a longitudinal distance of these points can be made longer, so that the pedal bracket 200 can be fixed stably during the normal state.

Next, the present embodiment provides one of the contact points as the rear end face 203 and the other of the contact points as the axis 103 integrated with the pedal 100. According to this structure, the pedal bracket 200 and the support structure A as a whole can be made compact. Namely, since only the one of the contact points (the rear end face 203) is applied to the pedal bracket 200 and thus there can be provided a high rigidity portion only for this contact point, the pedal bracket 200 does not necessarily require high rigidity as a whole and therefore it can be made compact as much as possible. Further, the pedal bracket 200 can be configured so as to be bent by an even smaller load. Herein, since the pedal 100 is originally designed to have a high rigidity, providing only the contact point of the axis 103 having a high rigidity to the pedal 100 may not bring a large-sized structure.

The first and second guide members 300 and 400 are fixed integrally via bolts or the like with the contact of the attaching face 303 and the attaching face 403. The second guide member 400 is supported at the instrument panel reinforcement 5 via the hanger bracket 7 by fastening the attaching face 401 to the hanger bracket 7 via bolts or the like. Accordingly, the first and second guide members 300 and 400 are integrally supported at the instrument panel reinforcement 5. Herein, the first guide member 300 may be fixed to the hanger bracket 7, or the first and second guide members 300 and 400 may be separately fixed to the hanger bracket 7.

Next, function of the pedal support structure A with the above-described structure during the vehicle frontal crash or the like will be described referring to FIG. 5A through 5E. FIG. 5A illustrates a normal state in which the axis 103 is away from the first guide faces 301a and the rear end face 203 is away from the second guide face 404, and the pedal bracket 200 is fixed to the fixing portions 302a of the first guide member 300. Herein, when the automotive vehicle equipped with the pedal support structure A has a frontal crash or the like with an obstacle and the impact load acts on the pedal bracket 200 backward, the fixation of the pedal bracket 200 at the fixing portions 302a, as described referring to FIG. 4B, is released and the pedal bracket 200 and the pedal 100 are moved backward and then the axis 103 comes to contact the first guide faces 301a (FIG. 5B). At this moment, the rear end face 203 is still away from the second guide face 404.

Then, as illustrated in FIG. 5C, the axis 103 is guided by the first guide faces 301a and slides on them, thereby changing the position of the pedal bracket 200 and the pedal 100. More specifically, the pedal bracket 200 and the pedal 100 are moved backward and downward, and the pedal bracket 200 starts to be bent and the rear portion of the pedal bracket 200 starts to rotate clockwise in the figure. As a result, even if the pedal bracket 200 has been moved backward, the position of the pad portion 102 may be adjusted in its original position illustrated in FIG. 5A or a little forward position, so that the backward movement of the pad portion 102 can be restrained. At this moment, the pedal bracket 200 receives the impact load from the dash panel 1 via the front end portion 204, and it receives the reaction force from the first guide faces 301a supported at the instrument panel reinforcement 5 via the axis 103 and is bent thereby. Herein, since the axis 103 is provided at the rear portion of the pedal bracket 200 in the preset embodiment, a grater bending moment can be applied to the pedal bracket 200 with a longer distance between the axis 103 and the front end portion 204. Thus, bending of the pedal bracket 200 can be facilitated.

When the pedal bracket 200 has been moved backward further, the position of the pedal bracket 200 and the pedal 100 changes further so as to move the pad portion 102 frontward, and the axis 103 becomes away from the first guide faces 301*a* and instead the rear end face 203 comes to contact the second guide face and slides on it (FIG. 5D). Herein, since the rear end face 203 is located more far from the front end portion 204 than the axis 103, a much greater bending moment is applied to the pedal bracket 200. Accordingly, the pedal bracket 200 can be surely deformed to an expected great degree. Under this process, the pedal bracket 200 can be bent greatly and eventually broken. Herein, the operating rod 13 is also bent, which is not illustrated.

Subsequently, the pedal bracket 200 and the peal 100 change their position by the rear end face 203 slinging on the second guide face 404, and the pad portion 102 is moved forward further thereby. Since the rear end face 203 includes the arc-shaped curved face which is continuous to the upper end face of the upper plate portion 202 in the present embodiment, the upper plate portion 202 contacts the lower end portion of the second guide face 404 and slides below (FIG. 5E) after the rear end face 203 has reached a slide terminal point at the lower end portion of the second guide face 404. Thus, the longer slide distance can be provided to the even compact structure, and the position change of the pedal bracket 200 and the pedal 100 can last longer. Accordingly, a sufficient foot space can be ensured for the driver even during the vehicle frontal crash or the like in the present embodiment.

Herein, although the guide faces (301*a*, 404) are formed to slant straightly in the above-described embodiment, these may be formed to be curved faces. Also, the axis 300 and the rear end face 203 are configured as the contact portions, any other proper portions of the pedal 100 and the pedal bracket 200 can be configured as the contact portions. Also, separate members and these pedal 100 and pedal bracket 200, which are integrated with each other, can be configured as the contact portions.

Herein, by arranging the first guide face such that a direction perpendicular to the first guide face in an initial contact position of the first contact portion does not pass an axis center of the instrument panel reinforcement, the impact load against the instrument panel reinforcement can be reduced properly and a bending moment can be made small thereby. Also, by arranging the first guide face such that the direction perpendicular to the first guide face gradually gets close to the axis center of the instrument panel reinforcement as the first contact portion slides on the first guide face, bending of the pedal bracket can be promoted further later on. Hereinafter, this structure will be described in detailed referring to FIGS. 6A through 6C.

First, layout relationships between the instrument panel reinforcement 5 and the contact portions (103, 203) and guide faces (301*a*, 404) will be described referring to FIG. 6A through 6C. In the present embodiment, it is arranged such that a direction (an arrow line d1 in FIG. 6A) perpendicular to the first guide faces 301*a* in an initial contact position of the axis 103 does not pass an axis center P of the instrument panel reinforcement 5. Herein, the initial contact position means a position in which the axis 103 moves backward from its position away from the first guide faces 301*a* and then contacts the first guide face 301*a* when the pedal bracket 200 is moved backward due to the vehicle frontal crash or the like. In other words, the initial contact position is a position where the impact load is applied. Since the direction of the impact load is not necessarily fixed, the initial contact position is expected to change a little. However, it will be located within a specified range. Also, if the axis 103 is arranged so as to contact the first guide faces 301*a* from its initial state, this initial state should be the above-described contact position.

Herein, a segment of the impact load which is parallel to the first guide faces 301*a* is negligibly small, compared to a segment thereof which is perpendicular to the faces 301*a*. Accordingly, the direction of the impact load becomes a direction substantially perpendicular to the first guide faces 301*a* as illustrated by the arrow line d1 in FIG. 6A. Herein, the slant angle of the first guide faces 301*a* is arranged such that the direction (the arrow line d1) which is perpendicular to the first guide faces 301*a* in its initial contact position of the axis 103 does not pass the axis center P of the instrument panel reinforcement 5 as illustrated in FIG. 6A. According to this structure, the impact load against the instrument panel reinforcement 5 can be reduced properly and the bending moment can be made small, thereby preventing it from being broken. Further, since the impact load does not act on the cross section of the instrument panel reinforcement 5 as illustrated, the impact load can be reduced further.

According to the present embodiment, since the impact load against the instrument panel reinforcement 5 can be reduced, not only any particular structural reinforcing will not be necessary, but the grade of the first guide faces 301*a* may be made more perpendicular as long as the instrument panel reinforcement has the same structure. Thus, a longitudinal length of the first guide faces 301*a* or a distance between the first guide faces 301*a* and the second guide face 404 can be made shorter, and therefore the compact structure can be attained and the bending of the pedal bracket 200 can be facilitated.

Next, a stage after an initial stage of the vehicle frontal crash will be described. Although the impact load acting on the instrument panel reinforcement 5 becomes peak due to the input of impact load at the initial stage of the vehicle frontal crash, the load gradually becomes stable as the axis 103 slides on the first guide faces 301*a*. In this case, since the instrument panel reinforcement 5 seems not to be broken, it is preferable that the load which the first guide faces 301*a* receives from the axis 103 can be born by the instrument panel reinforcement 5 and the reaction force to the bending of pedal bracket 200 can be resisted. Accordingly, the impact load against the instrument panel reinforcement 5 can be reduced properly, and therefore the pedal bracket 200 can be surely deformed to the expected great degree and the pad portion 102 of the pedal 100 can be restrained from being moved backward.

In the present embodiment, the direction perpendicular to the first guide faces 301*a* at respective slide portions gradually approaches to the axis center of the instrument panel reinforcement 5 as the axis 103 slides on the first guide faces 301*a*. FIG. 6B illustrates the axis 103 sliding on the first guide faces 301*a*. In FIG. 6B, an arrow line d2 illustrates the direction perpendicular to the first guide faces 301*a* at the present slide portion of the axis 103, and this direction also means a direction in which the first guide faces 301*a* receive the load from the axis 103. Herein, an offset value between the arrow line d2 and the axis center P in FIG. 6B (a length of a perpendicular line between the axis center P and the arrow line d2) is smaller than an offset value between the arrow line d1 and the axis center P in FIG. 6A (a length of a perpendicular line between the axis center P and the arrow line d1). Namely, the direction perpendicular to the first guide faces 301*a* gradually gets close to the axis center. Therefore, at the initial stage of the vehicle frontal crash, the impact load against the instrument panel reinforcement 5 can be reduced. Then after the stage, the load which the first guide faces 301*a* receive from the axis 103 can be properly born by the instrument panel reinforcement 5, and the bending of the pedal bracket 5 can be promoted thereby.

In the present embodiment, the first guide faces 301a are configured so as to slant straightly rearward and downward and be located before and below the axis center of the instrument panel reinforcement 5. Also, as illustrated in FIG. 6A, the arrow line d1 passes above the instrument panel reinforcement 5. Accordingly, the direction perpendicular to the first guide faces 301a (i.e., the acting direction of the load which the first guide faces 301a receive from the axis 103) at respective portions of the axis 103 moves downward substantially in parallel, passing through the instrument panel reinforcement 5, as the axis 103 moves downward on the first guide faces 301a. As a result, the load come to act on the cross section of the instrument panel reinforcement 5. Thus, the instrument panel reinforcement 5 can properly bear the load which the first guide faces 301a receive from the axis 103, and bending, particularly, initial deforming of the pedal bracket 200 can be generated surely.

Next, the slide of the rear end face 203 on the second guide face 404 will be described. FIG. 6C illustrates the rear end face 203 sliding on the second guide face 404. In the present embodiment, the second guide face 404 is configured such that a direction perpendicular to the second guide face 404 passes through the instrument panel reinforcement 5 at its specified portion. An arrow line d3 in FIG. 6C illustrates the direction perpendicular to the second guide face 404 at the slide portion of the rear end face 203, and this direction also means a direction in which the second guide faces 404 receives the load from the rear end face 203. Since the arrow line d3 passes through the instrument panel reinforcement 5, the load which the second guide face 404 receives from the rear end face 203 acts on the cross section of the instrument panel reinforcement 5. This arrow line d3 just illustrates the direction at one point, but the direction perpendicular to the second guide face 404 passes through the instrument panel reinforcement 5 at specified portions. In the present embodiment, the second guide face 404 is configured so as to slant straightly rearward and downward. Accordingly, the direction perpendicular to the second guide face 404 at respective portions moves downward substantially in parallel as the rear end face 203 moves downward on the second guide face 404 in the same way as the case of the first guide faces 301a.

Figure 6C:
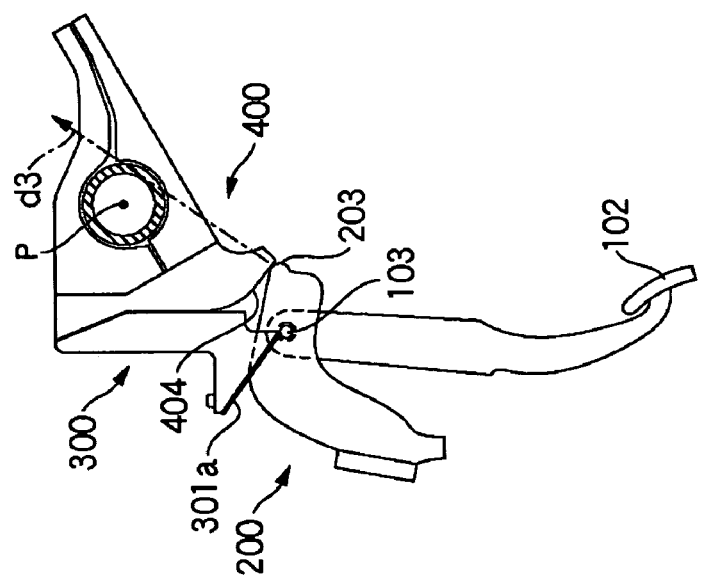
FIGS. 6A through 6C are explanatory diagrams illustrating positional relationships of first guide faces 301a, a second guide face 404, and an instrument panel reinforcement 5.
Figure 6B:
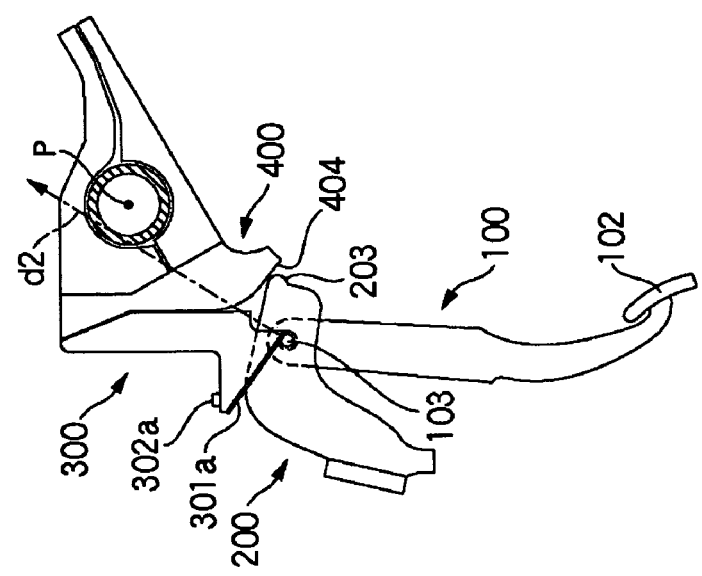
Figure 6A:
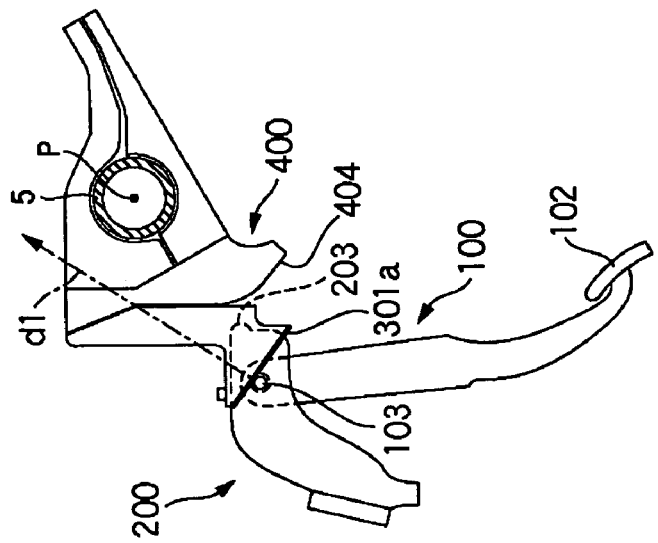
Figure 8:
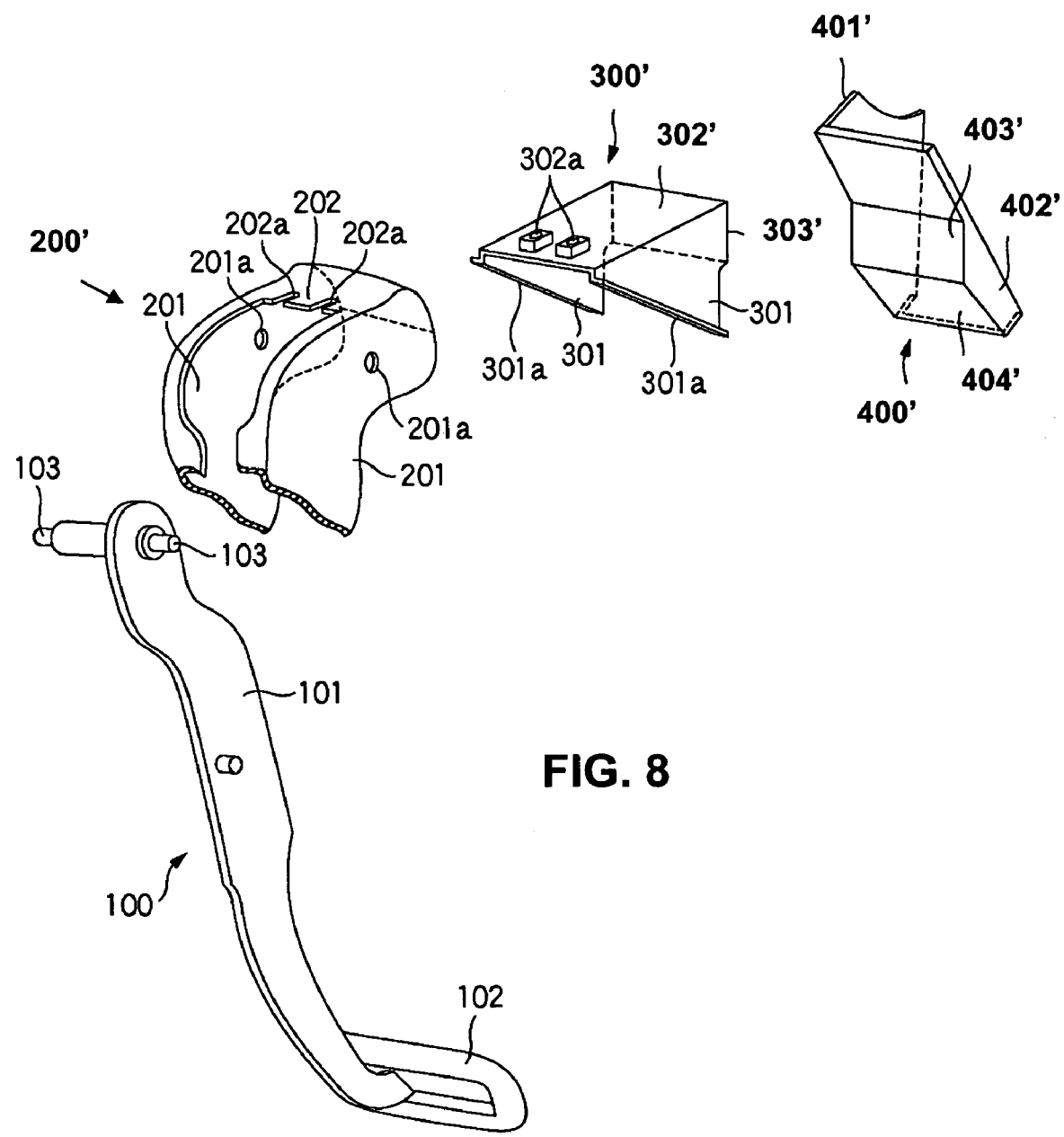
FIG. 8 is an exploded (partially sectional) view of parts of a pedal support structure A according to another embodiment of the present invention.

In the present embodiment, since the arrow line d1 in FIG. 6A passes above the instrument panel reinforcement 5, an offset value between the arrow line d3 and the axis center P in FIG. 6C is smaller than the offset value between the arrow line d1 and the axis center P in FIG. 6A. Thus, a larger impact load tends to be applied to the instrument panel reinforcement 5, compared to the time the impact load is applied. Further, since the direction perpendicular to the second guide face 404 passes through the instrument panel reinforcement 5 at specified portions on the second guide face 404, the load acts on the cross section of the instrument panel reinforcement 5 and the impact load tends to be applied further. Namely, when the rear end face 203 slides on the second guide face 404, the load which the second guide face 404 receives from the rear end face 203 always acts on the cross section of the instrument panel reinforcement 5, and accordingly the load can be properly born by the instrument panel reinforcement 5 and the pedal bracket 200 can be deformed to the expected great degree. Thus, according to the present embodiment, the impact load against the instrument panel reinforcement 5 can be reduced properly when it is applied, so that instrument panel reinforcement 5 can be restrained from being broken and the pedal bracket 200 can be surely deformed to the expected great degree.

Next, function of the first guide member 300 in which when the impact load is applied to the first guide faces 301a, the first guide member 300 is slid in a vertical direction of the vehicle will be described referring to FIGS. 7A and 7B. Herein, although the first guide member 300 is slid upward in this embodiment, it may be configure so as to be slid downward instead.

As illustrated in FIG. 7A, when the impact load is applied to the pedal bracket 200 in the normal state toward the right and upward, the first guide member 300 receives the backward-and-upward impact load, via the fixing portions 302a or the first guide faces 301a after releasing of the fixation of the fixing portions 302a. The first guide member 300 is restrained from being moved upward because it is fixed to the attaching face 403 at its attaching face 303. When the impact load exceeds a specified value, however, the attaching face 303, which extends substantially vertically with a specified angle, starts to slide on the attaching face 403, and the first guide member 300 is slid upward slightly as illustrated in FIG. 7B. In order to allow the first guide member 300 to be slid upward described above, fastening means comprising a bolt and a bolt hole having a larger diameter than that of the bolt can be provided for fixing the attaching face 303 to the attaching face 403. Also, deformation of fastening means like the bolt or the like may be used as well.

To allow the first guide member 300 to be slid upward slightly can provide damping function of the impact load, and the impact load acting on the instrument panel reinforcement 5 can be reduced properly thereby. Also, since the attaching face 303 slants straightly backward and downward, the first guide member 300 is guided by the grade of the attaching face 303 and a forward-and-upward reaction force is generated at an upper portion of the first guide member 300. Accordingly, the first guide member 300 is rotated slightly counterclockwise, and the slant angle of the first guide faces 301a becomes slightly gentle compared to its initial angle. Thus, the axis 103 can slide smoothly. According to such a proper arrangement of the grade of the attaching face 303, the first guide member 300 can be controlled so as to be slid properly and influences of the slant angle of the first guide faces 301a can be controlled appropriately.

Also, since after the axis 103 has slid on the first guide faces 301a, the rear end face 203 slides on the second face 404 and thus a final position of the pedal 100 and pedal bracket 200 relies on the second guide face 404, a greater position change of the pedal 100 and pedal bracket 200 can be obtained properly.

Herein, by arranging such that the first contact portion goes away from the first guide face by the second contact portion sliding on the second guide face, it can be avoided that the first and second contact portions come to engage with the first and second guide faces. Hereinafter, this structure will be described in detailed referring to FIGS. 8, 9A through 9F, 10A and 10B. The same portions/parts as those of the previous embodiment illustrated in FIGS. 3, 4A, 4B, 5A through 5E are denoted by the same reference numerals and detailed descriptions of those will be omitted here. The corresponding parts are denoted by reference numerals with an one-dash mark.

In the present embodiment, the first and second guide member 300' and 400' are different from those in the previous embodiment in their shapes primarily. The first guide member 300' includes a ledge plate portion 302' and an attaching face 303', and the second guide member 400' includes an attaching face 401', side plate portion 402', attaching portion 403' and a second guide face 404', likewise.

The slant angle of the first guide faces 301a may be configured so as to be relatively horizontal so that the initial deformation of the pedal bracket 200' can be obtained and the impact load can not act on the instrument panel reinforcement 5 excessively during the slide of the axis 103. Meanwhile, the slant angle of the second guide face 404' may be configured so as to be relatively vertical so that the pedal bracket 200' can be surely deformed to the expected great degree and the pad portion 102 can be surely restrained from being moved backward. In the present embodiment, the slant angle of the guide face 404' is configured so as to be more vertical than that of the guide faces 301a.

When the pedal bracket 200' is further moved backward from the state of FIG. 9A, the pedal bracket 200' and pedal 100 change their positions so as to move the pad portion 102 forward, and the rear end face 203' comes to contact the second guide face 404' as illustrated in FIG. 9D. When the rear end face 203' contacts and starts to slide on the second guide face 404', the axis 103 goes away from the first guide faces 301a as illustrated in FIG. 9E. Thus, it can be avoided that the rear end face 203' and the axis 103 engage with the second guide face 404' and the first guide faces 301a. A structure that the axis 103 goes away from the first guide faces 301a by the rear end face 203' sliding on the second guide face 404 will be described referring to FIG. 10A, which is an exemplified face view of the rear end face 203'.

Figure 10A:
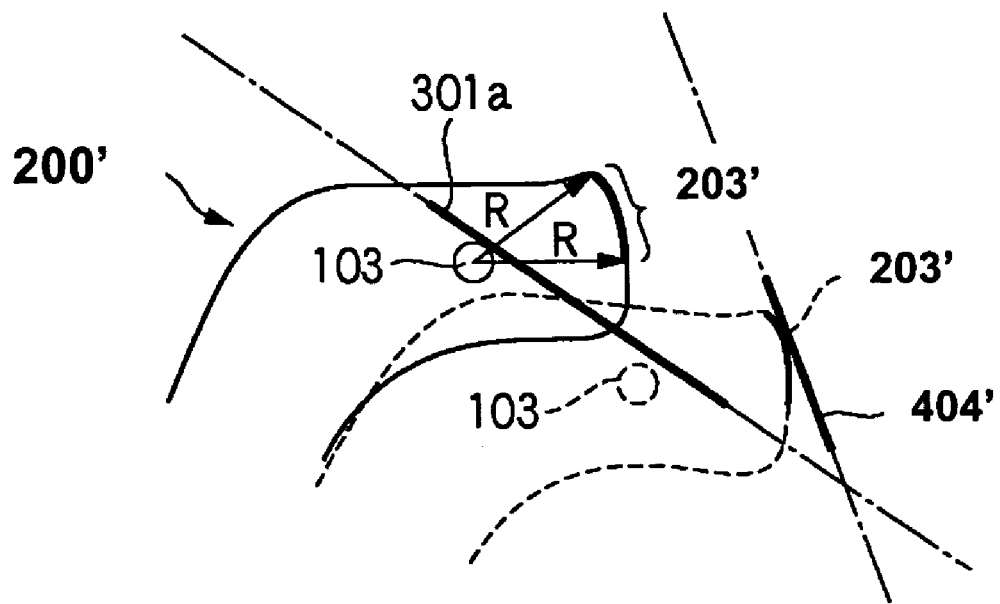
FIGS. 10A and 10B are exemplified face views of a rear end face 203'.

As described above, the slant angle of the second guide face 404' is configured so as to be more vertical than that of the first guide faces 301a in the present embodiment. Accordingly, a distance between the first guide faces 301a and the second guide face 404' gradually becomes smaller while going downward, as illustrated in FIG. 10A. Thus, by configuring such that the rear end face 203' is formed of an arc-shaped face having a constant radius R from the axis 103, a distance between the axis 103 and a surface of the rear end face 203' can be made constant within a specified scope, as illustrated in FIG. 10A. According to the arrangement, when the rear end face 203' slides on the second guide face 404' downward, the distance between the axis 103 and the rear end face 203' becomes greater than the distance between the first guide faces 301a and the second guide face 404'. Thus, the axis 103 is moved forward relatively with respect to the first guide faces 301a and goes away from the first guide faces 301a.

Figure 10B:
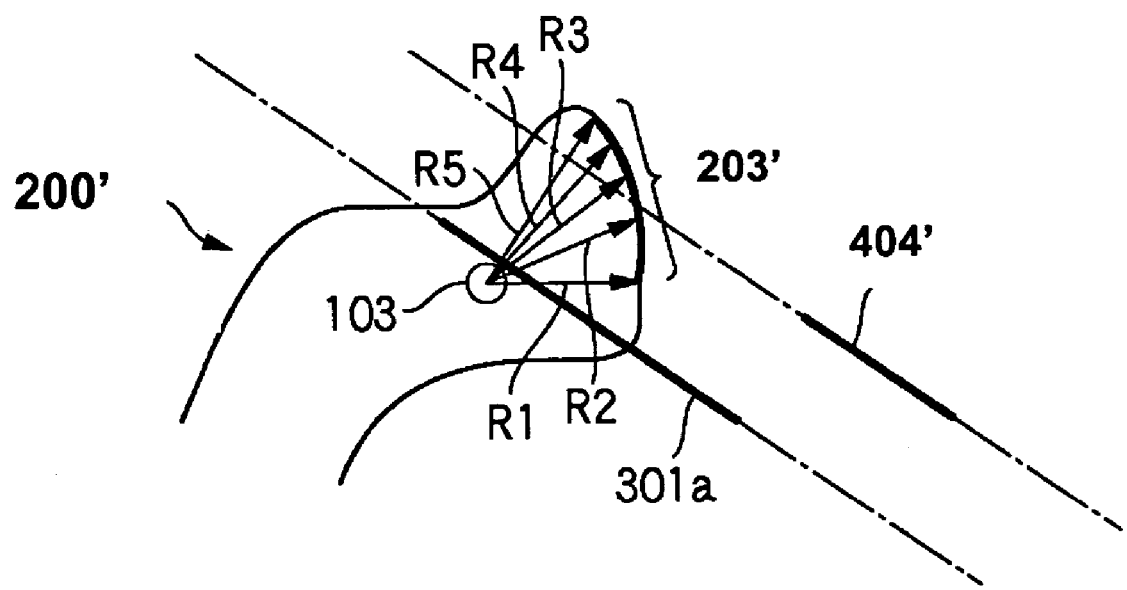

Herein, in a case in which the first guide feces 301a and the second guide face 404' are configured so as to be substantially parallel to each other as illustrated in FIG. 10B, the distance between them becomes substantially constant in any positions. In this case, by forming the surface of the rear end face 203' with the arc-shaped face having gradually changing distance from the axis 103, as illustrated in FIG. 10B, the same function may be obtained. Namely, the surface of the rear end face 203' is formed of the arc-shaped face having gradually changing distance from the axis 103: R1 through R5 (R1<R2<R3<R4<R5) in FIG. 10B. Accordingly, when the rear end face 203' slides on the second guide face 404', rotating clockwise in the drawing, a distance between the axis 103 and the contact point of the rear end face 203' on the second guide face 404' gradually becomes greater, and thus the axis 103 can be made go away forward from the first guide faces 301a. Herein, the same function may be obtained by arranging such that the slant angle of the second guide face 404' is configured so as to be more vertical than that of the first guide faces 301a as illustrated in FIG. 10A and the surface of the rear end face 203' is formed as illustrated in FIG. 10B.

Returning to FIGS. 9A through 9F, when the pedal bracket 200' is moved backward further, the rear end face 203' slides on the second guide face 404' with the axis 103 away from the first guide faces 301a, and the pedal bracket 200' and the pedal 100 change their positions further. In this process, the pedal bracket 200' is bent further and it has reached to its resilient limitation and then is broken eventually. Also, the operating rod 13 comes to be bent, which is not illustrated. As a result, the pad portion 102 is moved forward. The rear end face 203' has the arc-shaped curved face which is smoothly continuous to the upper plate portion 202 in the present embodiment. Accordingly, as illustrated in FIG. 9F, after the rear end face 203' has reached the slide terminal point of the lower end of the second guide face 404', the upper plate potion 202 contacts and slides on the second guide face 404'. As a result, the position change of the pedal bracket 200' and the pedal 100 can last longer. Accordingly, the sufficient foot space can be ensured for the driver even during the vehicle frontal crash or the like in the present embodiment. Particularly, when a transition from the slide of the axis 103 on the first guide faces 301a to the slide of the rear end face 203' on the second guide face 404' occurs, the axis 103 goes away from the first guide faces 301a. Thus, it can be avoided that the rear end face 203' and axis 103 come to engage with the second guide face 404' and first guide faces 301a, thereby attaining a smooth transition and slide.

Figure 11:
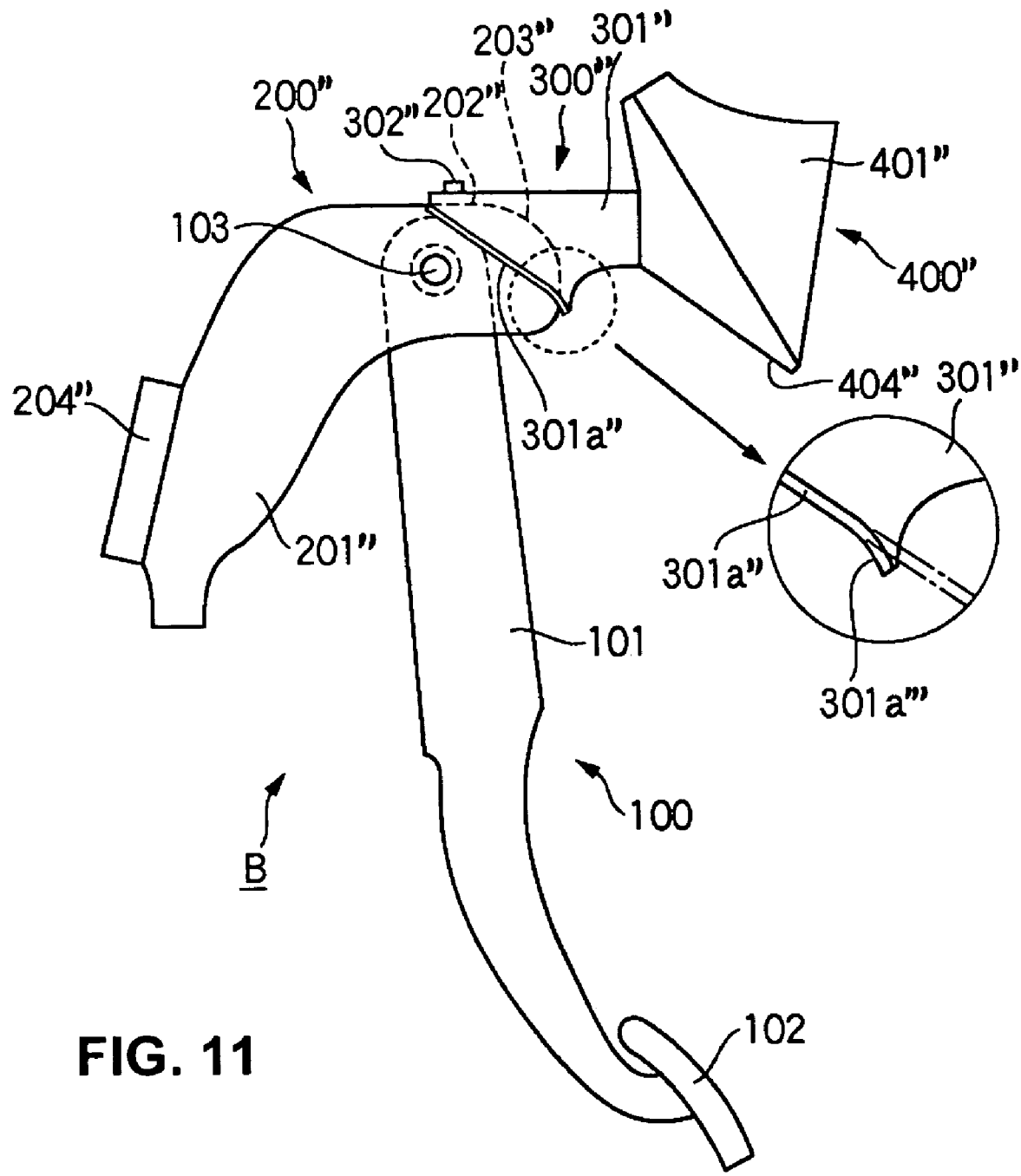
FIG. 11 is a schematic view of a major part of a pedal support structure A according to further another embodiment of the present invention.

Next, further another preferred embodiment will be described referring to FIGS. 11, 12A through 12E. The rear end face 203' is configured so as to contact the second guide face 404' when the axis 103 is sliding on the first guide faces 301a in the previous embodiment. However, the rear end face 203' may be configured so as to contact the second guide face 404' when the axis 103 has reached the slide terminal point and gown away from the first guide faces 301a. In this case, it is preferable that changes of the impact and the moving speed of the pedal bracket 200' may be reduced when the rear end face 203' comes to contact the second guide face 404'. Accordingly, the present embodiment comprises a structure illustrated in FIG. 11. FIG. 11 is a schematic diagram of a major part of a pedal support bracket A according to this embodiment. Herein, a different structure from the previous embodiment will be described primarily. The corresponding parts are denoted by reference numerals with a two-dash mark.

In the pedal support structure A of the present embodiment, there is provided a slant portions 301a''' at the lower end of the first guide faces 301a'' of the first guide member 300''. This slant portions 301a''' are configured so as to have a different grade thereof from other portions of the first guide faces 301a''. In the present embodiment, a grade of face of the slant portions 301a''' is more vertical than that of others, and it is formed so as to have a curved face slightly going downward as illustrated. The other parts of the first guide faces 301a'' than the slant portions 301a''' are formed to slant straightly. The slant portions 301a''' are the slide terminal point for the axis 103. Also, the second guide face 404'' of the second guide member 400'' is formed to be straight and in parallel to the first guide faces 301a'' (except the slant portions 301a'''). The rear end face 203'' of the pedal bracket 200'' is configured so as to come to contact and slide on the second guide face 404'' after the axis 103 has slid on the slant portions 301a''' of the first guide faces 301a'' and gone away downward from them.

Next, function of the pedal support structure A of the present embodiment will be described referring to FIGS. 12A through 12F. Although the function of this is almost the same as that of the previous embodiment, there is a difference in the transition from the slide of the axis 103 on the first guide faces 301a" to the slide of the rear end face 203" on the second guide face 404". In the normal state illustrated in FIG. 11, the axis 103 is away from the first guide faces 301a" and the rear end face 203" is away from the second guide face 404", respectively, and the pedal bracket 200" is fixed at the fixing portions 302a" of the first guide member 300".

Herein, when the vehicle equipped with the pedal support structure A crashes against the obstacle or the like and the impact load is applied to the pedal bracket 200" backward, the fixation of the pedal bracket 200" at the fixing portions 302a" is released, like the previous embodiment, and the pedal bracket 200" and pedal 100 are moved backward slightly and the axis 103 contacts and slides on the first guide faces 301a" (FIG. 12A). At this stage, the rear end face 203" is still away from the second guide face 404".

Then, the axis 103 is guided by and slides on the first guide faces 301", and the pedal bracket 200" and pedal 100 change their positions, as illustrated in FIG. 12B. Accordingly, regardless of the backward movement of the pedal bracket 200", the pad portion 102 of the pedal 100 is moved to its normal position illustrated in FIG. 11 or forward further, so that the backward movement of the pad portion 102 can be restrained from being moved backward.

As the pedal bracket 200" is further moved backward, the pedal bracket 200" and pedal 100 change their positions further to move the pad portion 102 forward, and the axis 103 comes to the slide terminal point at the lower end of the first guide faces 301a" as illustrated in FIG. 12C. Since there is provided at the slide terminal point the slant portion 301a'" having a steeper grade than other portions of the first guide face 301a" as described above, the speed of backward movement of the pedal bracket 200" and pedal 100 is reduced. Then, the axis 103 goes away from the first guide feces 301a" as illustrated in FIG. 12D. Subsequently, the rear end face 203" contacts the second guide face 404".

Accordingly, it can be avoided that the axis 103 and the rear end face 203" slide concurrently. Also, since the axis 103 has just passed the slant portion 301'" at this moment, the speed of the backward movement of the pedal bracket 200" has been reduced once. Thus, the rear end face 203" which is part of the pedal bracket 200" has reduced its speed backward, or toward the second guide face 404" as well. Accordingly, the rear end face 203" contacts the second guide face 404" at a smaller speed, compared to the case in which there is provided no slant portion 301a'". As a result, the impact of the rear end face 203" against the second guide face 404" can be reduced properly.

Then, as illustrated in FIG. 12E, the rear end face 203" slides on the second guide face 404" with the axis 103 and the first guide faces 301a" being separate from each other, thereby further changing the position of the pedal bracket 200" and pedal 100. In this process, the pedal bracket 200" is bent further and it has reached to its resilient limitation and then is broken eventually. Also, the operating rod 13 comes to be bent, which is not illustrated. As a result, the pad portion 102 is moved forward.

As described above, according to the pedal support bracket A of the present embodiment, it can be avoided that the axis 103 and the rear end face 203" slide concurrently. Also, since there is provided the slant portion 301a'" at the slide terminal point of the first guide face 301a", changes of the impact and the moving speed of the pedal bracket 200" can be reduced when the rear end face 203" comes to contact the second guide face 404" and the smooth transition and slide can be attained. The slant portion 301a'" is provided for the purpose of reducing the approaching speed of the rear end face 203" to the second guide face 404". Accordingly, the slant angle of the slant portion 301a'" may be preferably formed so as to get closer to a direction perpendicular to an approaching direction of the rear end face 203" to the second guide face 404" than other portions of the first guide faces 301a". In the present embodiment, since the second guide face 404" is disposed rearward the rear end face 203", the slant angle of the slant portion 301a" is configured so as to be more vertical.

Also, the slant portion 301a'" can be formed by just bending slightly the lower end of the first guide faces 301a", and thus the approaching speed of the rear end face 203" to the second guide face 404" can be reduced by a simple structure. Although the slant portion 301a'" may be configured so as to slant straightly, its curved-shaped forming can make the axis 103 slide smoothly.

Further, the first guide faces 301a" and the second guide face 404" are configured so as to be in parallel to each other and extend straightly in the present embodiment. In this case, assuming that the load applied to the pedal bracket 200" is almost constant during the slide of the axis 103 and the rear end face 203", the load applied to the instrument panel reinforcement 5 becomes substantially constant and may not change unexpectedly.

Herein, by arranging such that the first guide face includes a front end portion extending upward from the fixing portion and there is provided a restraint structure at the front end portion, the grade of the first guide face can be restrained from changing to being more vertical. Hereinafter, this structure will be described in detailed referring to FIGS. 13 and 14A, 14B.

Figure 13:
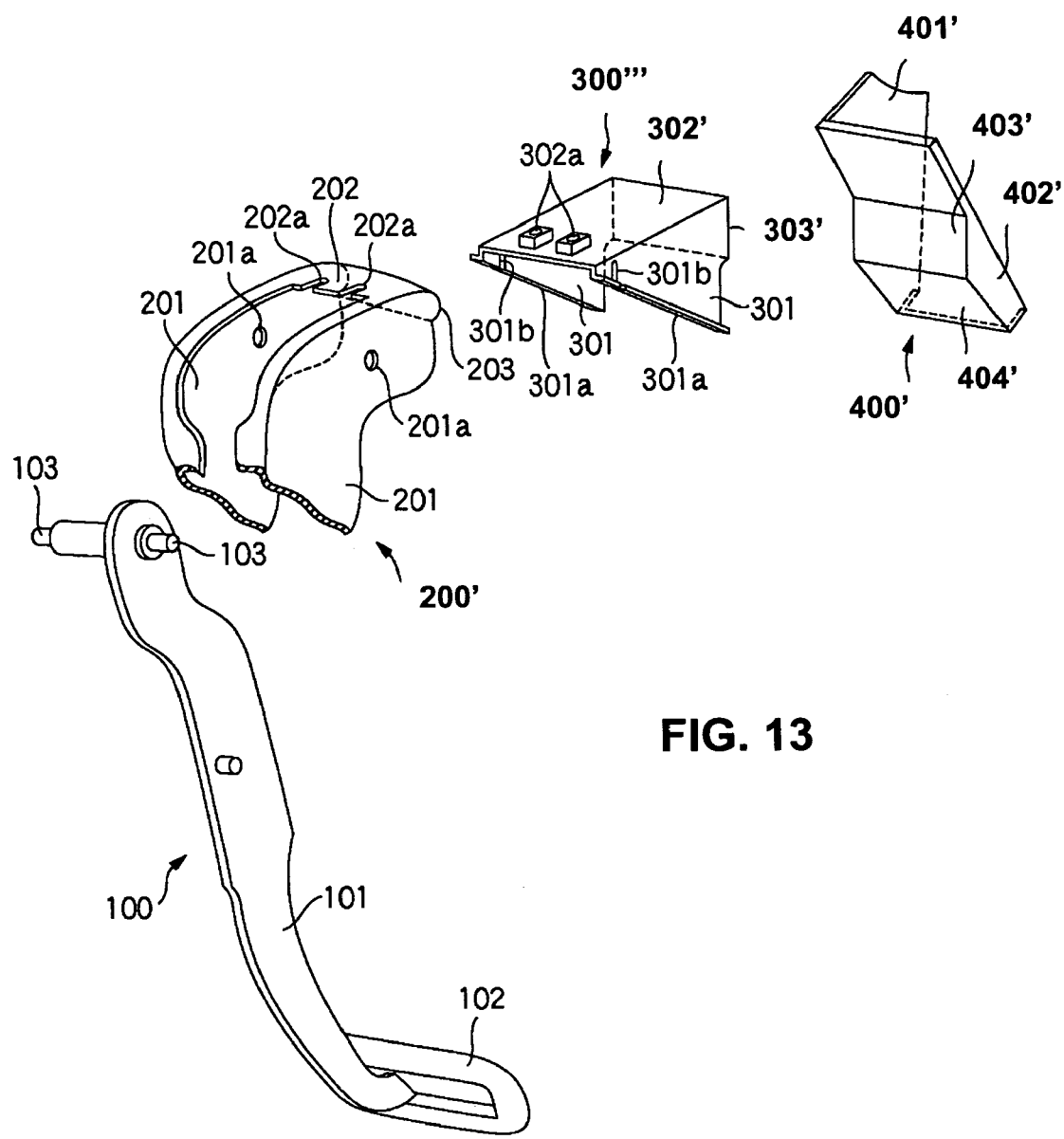
FIG. 13 is an exploded (partially sectional) view of parts of the pedal support structure A according to further another embodiment of the present invention.

In the present embodiment illustrated in FIGS. 13 and 14A, 14B, notch portions 301b are further formed at the both side plate portions 301 of the first guide member 300'" as the above-described restraint structure which is provided at front end portions of the first guide faces 301a to restrain the grade of the first guide faces 301a from changing to being more vertical when some vehicle component hits against the front end portions of the first guide faces 301a. These notch portions 301b are formed at the front portions of first guide faces 301a on the both side plate portions 301 so as to extend downward from upper ends of side plate portions 301.

Function of the notch portions 301b will be described referring to FIGS. 14A and 14B. First, FIG. 14A illustrates a state of the first guide member 300' at which no notch portion is formed. When some vehicle component hit against the front end portions of the first guide member 300', since the first guide faces 301a slant rearward and downward, the grade of the first guide faces 301a may be changed to being more vertical. Namely, when a certain vehicle component X hits against the front end portion of the first guide faces 301a as illustrated on the left of FIG. 14A, the first guide member 300' may rotate clockwise slightly and the slant angle of the first guide faces 301a may change from θ1 to θ1' (θ1<θ1') as illustrated on the right of FIG. 14A. Then, if the axis 103 contacts the first guide faces 301a after the slant angle has become more vertical, the impact load against the instrument panel reinforcement 5 may be increased too much. Accordingly, there is a concern that the instrument panel reinforcement 5 is broken and thus the enough reaction force necessary to bend the pedal bracket 200' can not be obtained properly from the instrument panel reinforcement 5.

Meanwhile, in the first guide member 300''' at which the above-described notch portions 301b are formed, when the certain vehicle component X hits against the front end portion of the first guide faces 301a as illustrated on the left of FIG. 14B, its front portion will be bent at the notch portions 301b as illustrated on the right of FIG. 14B. Namely, providing the notch portions 301b makes the front portion of the first guide faces 301a weaker than any other portion of the first guide member 300''', so that the front portion can be broken. Accordingly, the impact of the certain vehicle component X hits against the first guide member 300''' will be reduced as a whole, and thus the slant angle of the first guide faces 301a will change from θ2 to θ2' (θ2≈θ2'), so that the slant angle of the first guide faces 301a will hardly change. Although the notch portions 301b are used to make the front portion of the first guide faces 301b weaker than any other portion of the first guide member 300''' in the above-described embodiment, any other means, such as a plurality of small through holes formed around the front end portion, may be applied.

Figure 15A:
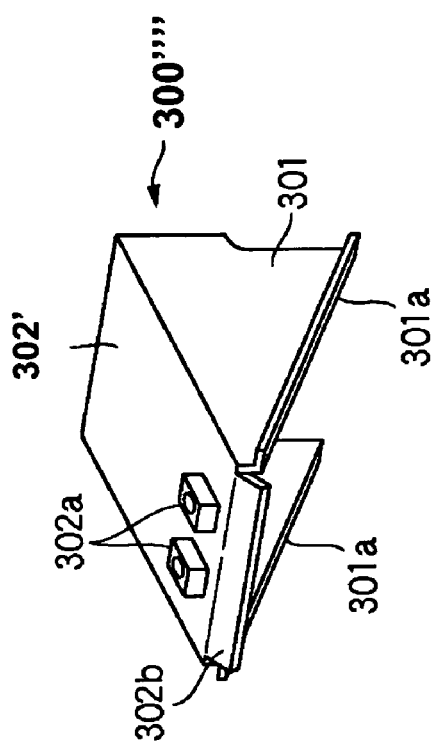
FIGS. 15A and 15B are diagrams illustrating function of another restraint structure of the first guide member.

Also, although the structure that the front end portion of the first guide faces 301a is used as the restraint structure in the above-described embodiment, any other structures to restrain the grade of the first guide faces 301a from becoming more vertical can be adopted. FIG. 15A illustrates another embodiment of the restraint structure. In this embodiment, there is provided a slant face 302b at the front portion of the first guide faces 301a, which is formed by a slant front end of the upper plate portion 302'. This slant face 302b slants forward and downward such that the load acting against the first guide member 300'''' by the certain vehicle component X acts so as to change the grade of the first guide faces 301a in a specified direction to being more horizontal (i.e., in the direction to rotate the first guide member 300'''' counterclockwise).

Figure 15B:
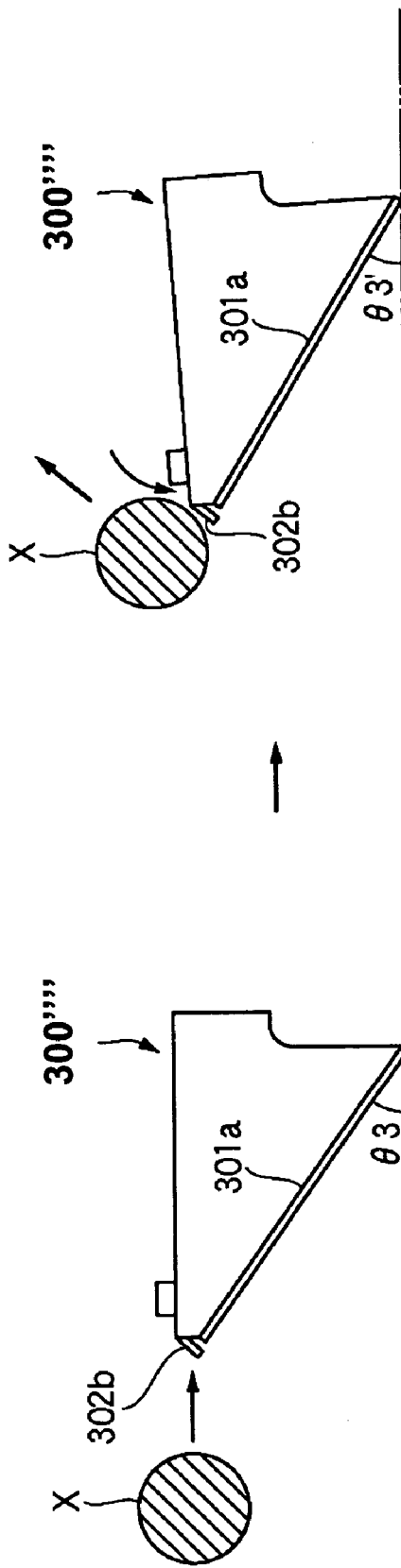

Function of this slant face 302b will be described referring to FIG. 15B. When the certain vehicle component X hits against the front end portion of the first guide faces 301a as illustrated on the left of FIG. 15B, a rotational force will be applied to the first guide member 300'''' counterclockwise as the slant face 302b slants forward and downward as illustrated on the right of FIG. 15B. Accordingly, the slant angle of the first guide faces 301a will change from θ3 to θ3' (θ3>θ3'). As a result, the slant angle of the first guide faces 301a will become more horizontal. Although it is not preferable that the slant angle of the first guide faces 301a change, changing to being horizontal may be acceptable because the impact load against the instrument panel reinforcement 5 will not increased. According to the pedal support structure A of the present embodiments described, since there is provided the restrain structure at the first guide member 300''', 300'''', it can be avoided that the grade of the first guide faces 301a become more vertical when some vehicle component hits it.

Herein, although there is provided the restraint structure at the first guide member in the above-described embodiment, the restraint structure may be provided at the second guide member, too. In this case, it may be preferable that the restraint structure provided at the second guide member is configured such that the grade of the second guide face becomes more vertical by the hit of the vehicle component unlike the case of the first guide member. This is because the second guide member is provided for the purpose of deforming the pedal bracket to the expected great degree surely so as to properly restrain the pedal and pad portion from moving backward.

Further, the present invention should not limited to the above-described embodiments, but any other modifications and improvements may be applied within the scope of a sprit of the present invention.

What is claimed is:

1. A pedal support structure for a vehicle, comprising:
   a pedal unit including a pedal with a pad portion, a pedal bracket to rotatably support the pedal, and first and second contact portions, either one of the first and second contact portions being provided at the pedal and the other one being provided at the pedal bracket;
   a guide member supported at an instrument panel reinforcement of the vehicle and including first and second guide faces, the first and second guide faces being respectively configured so as to slant rearward and downward, the guide member being operative to guide said pedal unit, when said pedal bracket is moved backward, via a rearward-and-downward slide of said first contact portion on said first guide face and a rearward-and-downward slide of said second contact portion on said second guide face such that a position of said pedal unit changes in such a manner that said pad portion of said pedal is restrained from being moved backward,
   wherein said first and second contact portions and said first and second guide faces are configured such that said second contact portion contacts and slides on said second guide face after said first contact portion has started to slide on said first guide face as said pedal bracket is moved backward, said first and second contact portions are disposed separately in a longitudinal direction of the vehicle and said first and second guide faces are disposed separately in the longitudinal direction of the vehicle, said first and second contact portions are located so as to be offset from each other in a vehicle width direction and said first and second guide faces are located so as to be offset from each other in the vehicle width direction as well corresponding to locations of said first and second contact portions, whereby said first and second contact portions and said first and second guide faces can be located substantially horizontally.

2. The pedal support structure for a vehicle of claim 1, wherein said pedal bracket includes a rear end portion and a front end portion which is fixed to a dash panel, said pedal includes an upper end portion which is supported at said rear end portion of the pedal bracket via an axis and a lower end portion at which said pad portion is provided, and said first contact portion is formed at part of said axis and said second contact portion is formed at a rear end face of said rear end portion of the pedal bracket.

3. The pedal support structure for a vehicle of claim 2, wherein said rear end face of the pedal bracket includes a curved face which is continuous to an upper end face of said rear end portion of the pedal bracket.

4. The pedal support structure for a vehicle of claim 1, wherein said guide member includes a fixing portion which fixes said pedal bracket thereto in such a manner that said first and second contact portions are separate from said first and second guide faces during a normal state, whereas said pedal bracket is allowed to be moved backward when a specified great load is applied to said pedal bracket backward, and said pedal bracket is fixed at said fixing portion and a dash panel of the vehicle.

5. The pedal support structure for a vehicle of claim 1, wherein said guide member includes a first guide member having said first guide face and a second guide member having said second guide face, and said first guide face is configured such that a direction perpendicular to said first guide face in an initial contact position does not pass an axis center of said instrument panel reinforcement, whereas the direction perpendicular to said first guide face gradually gets close to the axis center of said instrument panel reinforcement as said first contact portion slides on said first guide face.

6. The pedal support structure for a vehicle of claim 5, wherein said second guide face is configured such that an offset value between a direction perpendicular to said second guide face in a specified contact position and said axis center is smaller than an offset value between the direction perpendicular to said first guide face in the initial contact position and said axis center.

7. The pedal support structure for a vehicle of claim 5, wherein said first guide face is configured such that said direction perpendicular to said first guide face in the initial contact position passes above said instrument panel reinforcement.

8. The pedal support structure for a vehicle of claim 7, wherein said second guide face is configured such that a direction perpendicular to said second guide face in a specified contact position passes through said instrument panel reinforcement.

9. The pedal support structure for a vehicle of claim 5, wherein said first guide member includes an attaching face, and a grade of said attaching face is configured such that when a specified load is applied to said first guide face from said first contact portion, said first guide member is slid in a substantially vertical direction of the vehicle.

10. The pedal support structure for a vehicle of claim 1, wherein said first contact portion is configured so as to go away from said first guide face by said second contact portion sliding on said second guide face.

11. The pedal support structure for a vehicle of claim 10, wherein said first guide face and said second guide face are configured such that a distance therebetween gradually becomes smaller while going downward, and a distance between said first contact portion and said second contact portion is configured so as to be substantially constant.

12. The pedal support structure for a vehicle of claim 10, wherein said first guide face and said second guide face are configured so as to slant backward and downward respectively in parallel to each other, and said second contact portion is configured such that a surface thereof is formed of an arc-shaped face having gradually changing distance from said first contact portion as said second contact portion slides on the second guide face.

13. The pedal support structure for a vehicle of claim 10, wherein said guide member includes a fixing portion which fixes said pedal bracket thereto in such a manner that said first and second contact portions are separate from said first and second guide faces during a normal state, whereas said pedal bracket is allowed to be moved backward when a specified great load is applied to said pedal bracket backward, and said pedal bracket is fixed at said fixing portion and a dash panel of the vehicle.

14. The pedal support structure for a vehicle of claim 1, wherein said first and second contact portions and said first and second guide faces are configured such that said first contact portion slides on said first guide face when said pedal bracket is moved backward, and said second contact portion comes to contact said second guide face after said first contact portion has gone away from said first guide face, and a terminal end portion of said first guide face includes a slant portion which reduces an approaching speed of said second contact portion to said second guide face when said first contact portion goes away from said first guide face.

15. The pedal support structure for a vehicle of claim 14, wherein said first guide face is disposed backward with respect to said first contact portion and said second guide face is disposed backward with respect to said second contact portion, and a grade of said slant portion is configured so as to be more vertical than that of other portion of said first guide face.

16. The pedal support structure for a vehicle of claim 14, wherein said guide member includes a fixing portion which fixes said pedal bracket thereto in such a manner that said first and second contact portions are separate from said first and second guide faces during a normal state, whereas said pedal bracket is allowed to be moved backward when a specified great load is applied to said pedal bracket backward, and said pedal bracket is fixed at said fixing portion and a dash panel of the vehicle.

17. The pedal support structure for a vehicle of claim 1, wherein:
there is further provided a fixing portion which fixes said pedal bracket thereto in such a manner that said first and second contact portions are separate from said first and second guide faces during a normal state, whereas said pedal bracket is allowed to be moved backward when a specified great load is applied to said pedal bracket backward;
said first guide face includes a front end portion which extends upward from said first contact portion; and
there is provided a restraint structure at said front end portion which restrains a grade of said first guide face from changing to being more vertical when a vehicle component hits against said front end portion.

18. The pedal support structure for a vehicle of claim 17, wherein said restraint structure is configured such tat said front portion is made weaker than any other portion of said first guide member, whereby said front end portion can be broken by a hit of said vehicle component.

19. The pedal support structure for a vehicle of claim 17, wherein said restraint structure comprises a notch, whereby said front end portion can be broken by a hit of said vehicle component.

20. The pedal support structure for a vehicle of claim 17, wherein said restraint structure comprises a slant face which is configured such that a load caused by the hit of said vehicle component acts against said first guide member so as to change the grade of said first guide faces in a specified direction to be more horizontal.

21. The pedal support structure for a vehicle of claim 17, wherein said fixing portion is provided at said first guide member, and said pedal bracket is fixed at said fixing portion and a dash panel of the vehicle.

22. A pedal support structure for a vehicle, comprising:
a pedal unit including a pedal with a pad portion, a pedal bracket to rotatably support the pedal, and first and second contact portions, either one of the first and second contact portions being provided at the pedal and the other one being provided at the pedal bracket;
a guide member supported at an instrument panel reinforcement of the vehicle and including a first guide member having a first guide face and a second guide member having a second guide face, the first and second guide faces being respectively configured so as to slant rearward and downward, the guide member being operative to guide said pedal unit, when said pedal bracket is moved backward, via a rearward-and-downward slide of said first contact portion on said first guide face and a rearward-and-downward slide of said second contact portion on said second guide face such that a position of said pedal unit changes in such a manner that said pad portion of said pedal is restrained from being moved backward, wherein said first and second contact portions and said first and second guide faces are configured such that said second contact portion contacts and slides on said second guide face after said first contact portion has started to slide on said first guide face as said pedal bracket is moved backward, and said first guide face is configured such that a direction perpendicular to said first guide face in an initial contact position does not pass an axis center of said instrument panel reinforcement, whereas the direction perpendicular to said first guide face gradually gets close to the axis center of said instrument panel reinforcement as said first contact portion slides on said first guide face.

23. A pedal support structure for a vehicle, comprising:

a pedal unit including a pedal with a pad portion, a pedal bracket to rotatably support the pedal, and first and second contact portions, either one of the first and second contact portions being provided at the pedal and the other one beina provided at the pedal bracket;

a guide member supported at an instrument panel reinforcement of the vehicle and including first and second guide faces, the first and second guide faces being respectively configured so as to slant rearward and downward, the guide member being operative to guide said pedal unit, when said pedal bracket is moved backward, via a rearward-and-downward slide of said first contact portion on said first guide face and a rearward-and-downward slide of said second contact portion on said second guide face such that a position of said pedal unit changes in such a manner that said pad portion of said pedal is restrained from being moved backward, wherein said first and second contact portions and said first and second guide faces are configured such that said second contact portion contacts and slides on said second guide face after said first contact portion has started to slide on said first guide face as said pedal bracket is moved backward, and said first contact portion is configured so as to go away from said first guide face by said second contact portion sliding on said second guide face.

24. A pedal support structure for a vehicle, comprising:

a pedal unit including a pedal with a pad portion, a pedal bracket to rotatably support the pedal, and first and second contact portions, either one of the first and second contact portions being provided at the pedal and the other one being provided at the pedal bracket;

a guide member supported at an instrument panel reinforcement of the vehicle and including first and second guide faces, the first and second guide faces being respectively configured so as to slant rearward and downward, the guide member being operative to guide said pedal unit, when said pedal bracket is moved backward, via a rearward-and-downward slide of said first contact portion on said first guide face and a rearward-and-downward slide of said second contact portion on said second guide face such that a position of said pedal unit changes in such a manner that said pad portion of said pedal is restrained from being moved backward, wherein said first and second contact portions and said first and second guide faces are configured such that said first contact portion slides on said first guide face when said pedal bracket is moved backward, and said second contact portion contacts said second guide face after said first contact portion has gone away from said first guide face, and a terminal end portion of said first guide face includes a slant portion which reduces an approaching speed of said second contact portion to said second guide face when said first contact portion goes away from said first guide.

25. A pedal support structure for a vehicle, comprising:

a pedal unit including a pedal with a pad portion, a pedal bracket to rotatably support the pedal, and first and second contact portions, either one of the first and second contact portions being provided at the pedal and the other one being provided at the pedal bracket;

a guide member supported at an instrument panel reinforcement of the vehicle and including first and second guide faces, the first and second guide faces being respectively configured so as to slant rearward and downward, the guide member being operative to guide said pedal unit, when said pedal bracket is moved backward, via a rearward-and-downward slide of said first contact portion on said first guide face and a rearward-and-downward slide of said second contact portion on said second guide face such that a position of said pedal unit changes in such a manner that said pad portion of said pedal is restrained from being moved backward;

a fixing portion which fixes said pedal bracket thereto in such a manner that said first and second contact portions are separate from said first and second guide faces during a normal state, whereas said pedal bracket is allowed to be moved backward when a specified great load is applied to said pedal bracket backward, wherein said first guide face includes a front end portion which extends upward from said first contact portion, and there is provided a restraint structure at said front end portion which restrains a grade of said first guide face from changing to being more vertical when a vehicle component hits against said front end portion.

* * * * *